(12) United States Patent
Smith et al.

(10) Patent No.: US 9,075,630 B1
(45) Date of Patent: Jul. 7, 2015

(54) CODE EVALUATION OF FIXED-POINT MATH IN THE PRESENCE OF CUSTOMIZABLE FIXED-POINT TYPING RULES

(75) Inventors: Frederick Mattsson Smith, Natick, MA (US); Alexander Jean-Claude Bottema, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 1763 days.

(21) Appl. No.: 11/274,721

(22) Filed: Nov. 14, 2005

(51) Int. Cl.
*G06F 9/45* (2006.01)

(52) U.S. Cl.
CPC ...................................... *G06F 8/443* (2013.01)

(58) Field of Classification Search
None
See application file for complete search history.

(56) References Cited

U.S. PATENT DOCUMENTS

| | | | |
|---|---|---|---|
| 6,199,201 B1* | 3/2001 | Lamping et al. | 717/114 |
| 6,232,894 B1* | 5/2001 | Kawasaki | 341/83 |
| 6,516,461 B1* | 2/2003 | Ichisugi | 717/144 |
| 6,823,299 B1* | 11/2004 | Contreras et al. | 703/14 |
| 6,823,507 B1* | 11/2004 | Srinivasan et al. | 717/152 |
| 6,993,751 B2* | 1/2006 | Bhansali et al. | 717/137 |
| 7,152,228 B2* | 12/2006 | Goodwin et al. | 717/146 |
| 7,284,241 B2* | 10/2007 | Heishi et al. | 717/152 |
| 7,433,812 B2* | 10/2008 | Shakeri et al. | 703/15 |
| 7,444,619 B2* | 10/2008 | McManus | 717/114 |
| 7,461,116 B2* | 12/2008 | Allen | 708/495 |
| 7,523,443 B2* | 4/2009 | DeVane | 717/117 |
| 8,495,114 B1* | 7/2013 | Bryan et al. | 708/200 |
| 2002/0183998 A1* | 12/2002 | Shakeri et al. | 703/22 |
| 2004/0025150 A1* | 2/2004 | Heishi et al. | 717/154 |
| 2004/0073413 A1* | 4/2004 | Aberg et al. | 703/2 |
| 2004/0073913 A1* | 4/2004 | Fairweather | 719/328 |
| 2004/0139422 A1* | 7/2004 | Vion-Dury | 717/114 |
| 2004/0199480 A1* | 10/2004 | Unsworth et al. | 706/16 |
| 2004/0210869 A1* | 10/2004 | DeVane | 717/114 |
| 2005/0065990 A1* | 3/2005 | Allen | 708/495 |
| 2005/0229189 A1* | 10/2005 | McManus | 719/330 |
| 2006/0064670 A1* | 3/2006 | Linebarger et al. | 717/106 |
| 2007/0169040 A1* | 7/2007 | Chen | 717/146 |
| 2010/0161524 A1* | 6/2010 | Amid et al. | 706/12 |

OTHER PUBLICATIONS

B. Grobauer, Z. Yang "The Second Futamura Projection for Type-Directed Partial Evaluation" 2000, Proceedings of the 2000 ACM SIGPLAN workshop on Partial evaluation and semantics-based program manipulation, pp. 22-32.*
S. Helsen, P. Thiemann "Two Flavors of Offline Partial Evaluation" 1998, Proceedings of the 4th Asian Computing Science Conference ofn Advances in Computing Science.*
MathWorks "Fixed-Point Numbers" copyright 1994-2013 as downloaded from <http://www.mathworks.com/help/fixedpoint/ug/fixed-point-numbers.html> on Sep. 4, 2013.*

* cited by examiner

*Primary Examiner* — Jason Mitchell
(74) *Attorney, Agent, or Firm* — Harrity & Harrity, LLP

(57) ABSTRACT

Systems and methods are provided for using partial evaluation techniques to efficiently generate code for a fixed-point operation. The present invention uses partial evaluation techniques to evaluate a fixed-point rule of a fixed-point operation. The fixed-point rules, which may be customized by a user, determine the data type of the result or output of the operation. Although the values of all the inputs may not be known at code generation time, the present invention determines via static or known information associated with the input the portion of the fixed-point rule known at code generation time. As such, the present invention can generate more efficient code by generating code representing the static analysis of the inputs and fixed-point typing rules of the fixed-point operation.

39 Claims, 9 Drawing Sheets

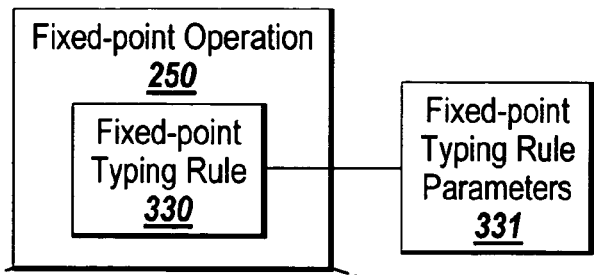

```
function c = plus(a0,b0)
% Copyright The MathWorks, Inc.
% Fixed-point typing rule parameters 331: a0, b0
  .
  .
  .

if ~isfi(b0) % fi + non-fi ta = eml_typeof(a0);

% Fixed-Point Typing Rule 330:  Verify that scaling is not slope-bias
  biasA = eml_const(get(ta,'Bias'));
  eml_assert(biasA==0,'fi math operations require fixed-point,binary-point scaling.');

% Fixed-Point Typing Rule 330:  Get best precision numerictype for b
  eml_assert(eml_is_const(b0),'In fi + non-fi, the non-fi must be a constant.');

tb = eml_const(emlGetBestPrecForMxArray(b0,ta));
  f = eml_fimath(a0);
  a = a0; b = eml_cast(b0,tb,f);

elseif ~isfi(a0) % non-fi + fi tb = eml_typeof(b0);

% Fixed-Point Typing Rule 330:  Verify that scaling is not slope-bias
  biasB = eml_const(get(tb,'Bias'));
  .
  .
  .
```

CODE EVALUATION OF FIXED-POINT MATH IN THE PRESENCE OF CUSTOMIZABLE FIXED-POINT TYPING RULES

TECHNICAL FIELD

The present invention generally relates to activation code for fixed-point operations using fixed-point rules.

BACKGROUND INFORMATION

Real numbers are any numbers that may be represented as finite or infinite decimals and may be used to measure continuous quantities, such as in the physcial sciences. The set of real numbers includes all rational numbers and all irrational numbers. Computers may approximate real numbers with rational numbers using a floating point number or fixed-point number representation or notation. In computer hardware, a number is stored in a binary word, which is a fixed-length sequence of binary digits (1's and 0's). A data type refers to the way in which data is classified, characterized, or represented. A binary number may be represented by a fixed-point data type or floating-point data type. A fixed-point number representation is a real data type for a number that has a fixed number of digits after the decimal, i.e., the decimal or binary point is fixed. In a floating-point data type, a real number is represented by an integer or fixed-point number multiplied by a base (typically a base 2 in computers) to some integer power, and the decimal point is referred to as floating.

A fixed-point data type may be characterized by the word size in bits, the binary point, and whether it is signed or unsigned. Additionally, fixed-point data types may be integers, fractions, or general fixed-point numbers. One of the differences between fixed-point and floating-point data types is the default binary point, which is the means by which fixed-point numbers are scaled. A fixed-point number may be encoded in a computer using a slope-bias encoding scheme. For example, a real number R may be encoded in a computer using a binary integer or quantized value Q by the following equation: $R=S*Q+B$, where S and B are real numbers. S is referred to as the slope and B as the bias. Q is computed by solving the equation and then rounding the result to an integer value. The slope S typically may be a number of the form $2^E$ because numbers of this form can be easily manipulated in hardware.

Binary numbers can also be represented as floating-point data types. A floating-point number in an Institute of Electrical & Electronic Engineers (IEEE) standard representation may approximately be stored as a [E,Q] pair where B is zero. This type of representation is called floating-point because E changes or floats depending on the values to be represented. In fixed-point representation, only the value Q is stored and the values for S and B do not change. As a result, fixed-point computations more often have overflow or underflow problems.

For both fixed-point and floating-point data types, word sizes are fixed at a set number of bits. However, the range of fixed-point values may be less than floating-point values with the same word size because the decimal point is fixed in the fixed-point representation. In order to prevent overflow or unreasonable quantization errors, fixed-point values are scaled. Fixed-point operations can be done with integer math support in a processor. However, floating-point math typically requires specialized hardware to obtain desired performance. As such, fixed-point is often used where the cost of hardware is an important consideration. The logic circuits of fixed-point hardware are much less complicated than floating-point hardware, which typically translates into a smaller size with less power consumption. Furthermore, fixed-point calculations generally use less memory and less processor time to perform.

Because the slope and bias are fixed in fixed-point operations, programming languages supporting fixed-point math may specify what the slope and bias for an output will be when multiple inputs with different slopes and biases are used together. For example, what should the slope of X+Y be if X has a slope of $2^{-4}$ and Y has a slope of $2^{-5}$. Obtaining fixed-point results with good precision while avoiding an overflow or underflow condition depends on making the appropriate slope and bias choice. Therefore, languages may have rules that specify this behavior. Unfortunately, any one set of rules will not be adequate for all applications. Compiling a language with rules that can change poses a technical difficulty when generating code for a processor, such as an embedded processor. A goal of a fixed-point implementation is to run efficiently on less expensive hardware. However, with rules that change, the fixed-point data type of a result may be difficult to determine.

SUMMARY OF THE INVENTION

The present invention provides systems and methods for evaluating a fixed-point operation in view of a fixed-point rule. The rule may be applied to the fixed-point operation to efficiently generate code for the operation. The rule may also be applied to provide an efficient in memory representation of the operation for emulation, for example, rather than for code generation. The fixed-point operation and fixed-point rule may be represented by instructions, such as instructions generated from a block diagram model. In one aspect, the present invention uses partial evaluation techniques to evaluate the fixed-point rule of the fixed-point operation and generate code representing the fixed-point rule and operation based on the partial evaluation. Partial evaluation techniques evaluate and create specialized instructions from a set of instructions, such as a program, having only a partial set of one or more inputs known at processing or compile time. In a further aspect, the present invention uses partial evaluation techniques to evaluate the fixed-point data type of a resulting output from the known or static information of one or more inputs of the operation. The present invention uses fixed-point rules, such as typing rules which may be customized by a user, to determine the data type of a result, which may be an intermediate result or a resulting output of the fixed-point operation. Although the values of input may not be known at code generation time, the present invention determines a reduction of the instructions of the operation or the fixed-point rule via any information associated with input. As such, the present invention can generate more efficient code for a target processor or another representation that is more efficient as determined from the partial evaluation techniques.

In one aspect, the present invention is related to a method practiced in a device for evaluation of a fixed-point operation having a fixed-point rule. The method provides an operation with at least one operand, and having a fixed-point rule for determining one or more characteristics of a fixed-point data type of a fixed-point result of the operation. The method also includes determining a portion of the fixed-point rule that may be known based on information associated with input to the operation, and generating a representation of the fixed-point operation that may have a reduction of instructions representing the known portion of the fixed-point rule. The reduction of the instructions may include adding, changing, or deleting an instruction of the operation or the fixed-point rule.

In one aspect, the method of the present invention generates a representation of the operation as providing the result with the fixed-point data type according to the fixed-point rule. The known portion of the fixed-point rule determined by the present invention may include 1) a determined characteristic of the fixed-point data type of the result of the operation, 2) a determined path of execution of instructions of the operation or the fixed-point rule, or 3) a determined value of one or more fixed-point typing rule parameters. The fixed-point rule may use a parameter representing one or more of the following characteristics of a fixed-point data type: 1) slope, 2) bias, 3) fraction length, 4) number of bits, 5) scaling, and 6) signed or unsigned. Additionally, the method of the present invention may include configuring the fixed-point rule to specify the fixed-point data type of the result based on one or more of the following: 1) type of operation, 2) desired precision, 3) overflow condition, and 4) underflow condition. The fixed-point rule may be specified or configured by a user.

In a further aspect of the present invention, the generated representation includes instructions encoded in a programming language different than a programming language of the instructions. The instructions of the operation may include an interpretive or a dynamically typed language. In some embodiments, the operation may be provided via a graphical model. The method of the present invention may also include generating the instructions for the operation from the graphical model.

In one aspect, the present invention relates to a device readable medium having device readable instructions to execute the steps of the method, as described above, related to a method for generating a representation for a fixed-point operation having a fixed-point rule.

In an additional aspect, an API is used to provide the fixed-point rule. The API may provide the information regarding the operand that is used for determining the known portion of the fixed-point rule. The partial evaluation maybe invoked via the API as well.

In a further aspect, the present invention relates to transmitting via a transmission medium computer data signals representing device readable instructions to execute the steps of the method, as described above, related to a method for generating a representation for a fixed-point operation having a fixed-point rule.

In yet another aspect, the present invention is related to a system for generating a representation for a fixed-point operation associated with a fixed-point rule. The system includes an environment for providing a representation of an operation having at least one fixed-point operand. The environment also includes a mechanism to provide a fixed-point rule with the operation. The fixed-point rule indicates one or more characteristics for specifying a fixed-point data type of a result of the operation. The system also includes a partial evaluator for determining a portion of the fixed-point rule that may be known based on information associated with input to the operation, and a representation generator for generating a representation of the fixed-point rule.

The environment of the system of the present invention may include a programming tool or a graphical modeling tool. The operation may be represented by either instructions or a portion of a graphical model. The instructions of the operation may include an interpretive or a dynamically typed language. The generated representation may include a programming language different than the programming language of the instructions. Additionally, the instructions may be provided for the operation via a graphical model, and the representation generator may generate the representation from the graphical model.

In one aspect, the representation generator of the present invention generates a representation to represent the operation as providing the result with the fixed-point data type according to the fixed-point rule. The known portion of the fixed-point rule determined by the present invention may include 1) a determined characteristic of the fixed-point data type of the result of the operation, 2) a determined path of execution of instructions of the operation or the fixed-point rule, or 3) a determined value of one or more fixed-point typing rule parameters. The fixed-point rule may use a parameter representing one or more of the following characteristics of a fixed-point data type: 1) slope, 2) bias, 3) fraction length, 4) number of bits, 5) scaling, and 6) signed or unsigned. Additionally, the system of the present invention may include the fixed-point rule configured to specify the fixed-point data type of the result based on one or more of the following: 1) type of operation, 2) desired precision, 3) overflow condition, and 4) underflow condition. The system may also include a configuration mechanism for a user to specify the fixed-point rule.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 3B is a block diagram illustrating a fixed-point typing rule for practicing an embodiment of the present invention;

DETAILED DESCRIPTION

Figure 1:
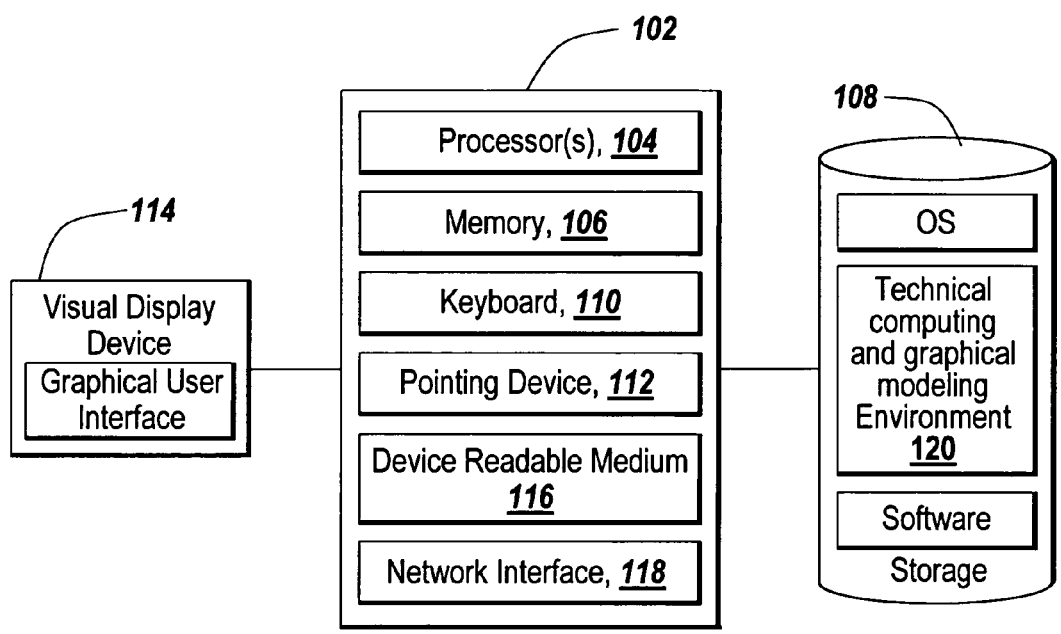
FIG. 1 is a block diagram of an illustrative computing device for practicing an embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for using partial evaluation techniques to evaluate fixed-point operations and produce efficient representations of the operations. This may entail generating efficient code for performing the operations or producing efficient in memory representations of the operations for emulation. Partial evaluation techniques evaluate and create specialized instructions from instructions having only a partial set of one or more inputs known at processing or compile time. Partial evaluation may be any type and/or form of static analysis. In one aspect, the present invention uses partial evaluation techniques to evaluate a fixed-point operation and determine the fixed-point data type of a result from the known input data types of one or more inputs of the operation, such as any operands, or any properties provided by or associated with the input. The present invention uses fixed-point typing rules, which may be customized by a user, to determine the data type of the result or output of the operation. Although the values of the operands may not be known at code generation time, the present invention determines via any known input data types, the resulting data type of an output or result of the fixed-point operation. The result may also be an intermediate result of an evaluation of an operand or input to the fixed-point operation. By using the techniques of the illustrative embodiment of the present invention, more efficient code for a target processor can be generated or more efficient in memory representations may be generated. The present invention can generate code representing the evaluation of the fixed-point operation determined from the partial evaluation techniques, such as the evaluation of a data type of a result.

The illustrative embodiment will be described solely for illustrative purposes relative to a technical computing and graphical modeling environment provided by the software products from The MathWorks, Inc. of Natick, Mass. Although the illustrative embodiment will be described relative to a MATLAB® and Simulink®-based application, one of ordinary skill in the art will appreciate that the present invention may be applied to other technical computing and/or graphical modeling environments, such as any environment using software products of LabVIEW® or MATRIXx from National Instruments, Inc., MSC.Adams® from MSC.Software Corporation of Santa Ana, Calif., Virtuoso from Cadence of San Jose, Calif., Dymola from Dynasim AB of Lund, Sweden, Rational Rose from IBM of White Plains, N.Y., Mathematica® from Wolfram Research, Inc. of Champaign, Ill., Mathcad from Mathsoft Engineering & Education Inc., or Maple™ from Maplesoft, a division of Waterloo Maple Inc.

FIG. 1 depicts an environment suitable for practicing an illustrative embodiment of the present invention. The environment includes a computing device 102 having memory 106, on which software according to one embodiment of the present invention may be stored, one or more processors (CPU) 104 for executing software stored in the memory 106, and other programs for controlling system hardware. The processor(s) 104 may include single cores or multiple cores, where separate processes may be executing on the respective cores for practicing the present invention. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may be used to display a graphical user interface (GUI).

The computing device 102 may include other I/O devices such as a keyboard 110 and a pointing device 112, for example a mouse, for receiving input from a user. Optionally, the keyboard 110 and the pointing device 112 may be connected to the visual display device 114. Additionally, the computing device 102 may include any type of input device for receiving user input, such as a joystick. In other embodiments, the computing device 102 may include any type of haptic or tactile feedback device, such as a vibration generating mouse, or a force feedback device such as a force feedback joystick. Also, the computing device 102 may include any type of sound producing I/O device such as any suitable sound card. The computing device 102 may include other suitable conventional I/O peripherals.

For installing software programs, the computing device 102 may support any suitable device readable medium 116, such as a CD-ROM, DVD-ROM floppy disks, tape device, USB device, hard-drive, or any other suitable device. The computing device 102 may further comprise a storage device 108, such as a hard-drive or CD-ROM, for storing an operating system and other related software. The illustrative embodiment of the present invention of a technical computing and graphical modeling environment 120 may comprise software that is installed via a device readable medium 116 and stored in the storage device 108. Additionally, the operating system and technical computing and graphical modeling environment 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Figure 2A:
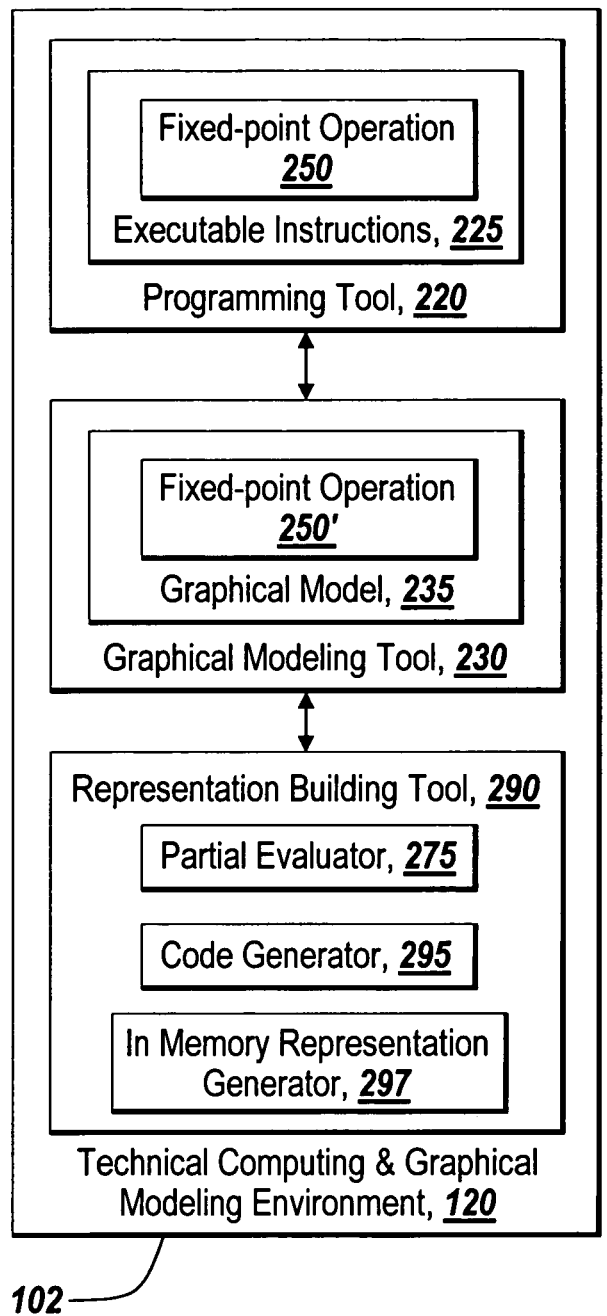
FIG. 2A is a block diagram of an illustrative technical computing and graphical modeling environment for practicing an embodiment of the present invention on the computing device of FIG. 1.

In one aspect, the present invention is related to a technical computing and graphical modeling environment 120 as illustrated in FIG. 2A. In brief overview, the illustrative technical computing and graphical modeling environment 120 includes a programming tool 220, a graphical modeling tool 230, and a code building tool 290. The programming tool 230 provides an environment for the design, development, testing, and execution of executable instructions 225, such as a program. The graphical modeling tool 230 provides an environment for the design, development, testing, simulation, and execution of a graphical model 235, such as a block diagram model. The graphical modeling tool 230 may also provide for incorporating or referencing a state diagram model and/or executable instructions 225 via the graphical model 235, such as a state diagram model provided via Stateflow® from The MathWorks, Inc of Natick, Mass. The representation building tool 290 may include a code generator 295 to provide for the code generation and building of executable forms of the executable instructions 225 and/or graphical model 235. The representation building tool 290 may alternatively or also include an in memory representation generator 297 that generates an in memory representation of a fixed point operation rather than generating code for the operation. This representation may be used in subsequent emulation of the fixed point operation. For example, the in memory representation generator 297 may generate an intermediate representation of the fixed point operation, such as an abstract syntax tree, that may subsequently be emulated by an interpreter. The programming tool 220 may be in communication with the graphical modeling tool 230 via any suitable type and form of interface. The representation building tool 290 may be in communication with or otherwise have any suitable type and form of interface to the programming tool 220 and/or the graphical modeling tool 230.

The illustrative programming tool 220 of the present invention comprises a design and development environment for creating any type and/or form of executable instructions 225. In an exemplary embodiment and by way of example, the programming tool 220 may comprise MATLAB® by The MathWorks, Inc. of Natick, Mass. In the exemplary embodiment, MATLAB® provides a technical computing environment and high-level technical computing programming language for a wide range of uses, such as math and computation, algorithm development, data acquisition, modeling, simulation, and prototyping, data analysis, exploration, and visualization, scientific and engineering graphics, and application development, including graphical user interface building. MATLAB® is an interactive system that uses as a data element an array or matrix that does not require dimensioning.

The programming tool of MATLAB® includes a development environment for editing and debugging programs, and an execution environment for testing and executing programs. MATLAB® also includes graphing capabilities for displaying vectors and matrixes as graphs, function libraries, such as for math and computational algorithms, and application programming interfaces (APIs) for interfacing to external systems or other environments. Additionally, the MATLAB® programming tool 220 integrates with graphical modeling tools 230, such as Stateflow® and Simulink® by The MathWorks, Inc. of Natick, Mass., to model, simulate, and analyze systems.

In some embodiments, the programming tool 220 includes language statements, application programming interfaces (APIs), functions, libraries or any other type and/of form of executable instructions 225 to perform or provide a fixed-point operation, math, or algorithm, such as the fixed-point operation 250 illustrated in FIG. 2A. In the exemplary embodiment of MATLAB®, the Fixed-Point Toolbox of The MathWorks, Inc. provides fixed-point data types and arithmetic in MATLAB®. The Fixed-Point Toolbox can be used to develop algorithms for testing, modeling, and verifying fixed-point implementations, such as a design for a fixed-point processor. Although the programming tool 220 is generally discussed in view of MATLAB®, one ordinarily skilled in the art will recognize and appreciate the various forms and types of programming tools and languages that may be used in practicing the operations of the present invention as described herein. For example, in a further embodiment, the programming tool 220 and executable instructions 225 may be used to develop, implement or provide the fixed-point operation 250 of the present invention in a functional programming language, which is a programming paradigm that treats computation as the evaluation of mathematical functions.

In some embodiments, the programming tool 220, or any portions thereof, is included in, integrated with, or is otherwise associated with a graphical modeling tool 230. The graphical modeling tool 230 of the present invention provides a graphical modeling environment for creating, designing, simulating, testing, and verifying a graphical model 235, such as a block diagram model. In an exemplary embodiment, the graphical modeling tool 230 includes the graphical modeling environment of Simulink® from the MathWorks, Inc. of Natick, Mass. In the graphical modeling tool 230, configurable and customizable functional blocks are used to create block diagram models that may represent a design, or algorithm, for a control system, a signal processing system, a communication system, any other time-varying or dynamic system or any computational hardware device. In other embodiments, the programming tool 220 is separate from the graphical modeling tool 230 but is otherwise interfaced or in communication with the graphical modeling tool 230.

In one aspect, a graphical model 235 may be used to provide a fixed-point operation 250. In some embodiments, the graphical model 235 may be used to generate executable instructions 225 for a fixed-point operation 250, from which the partial evaluation techniques of the present invention may be applied. In another embodiment, the graphical model 235, may include executable instructions 225, such as MATLAB®, to provide a fixed-point operation 250 of the present invention. The executable instructions 225 may be provided via a block, function or API of the graphical model 235. For example, the graphical model 235 may include an Embedded MATLAB® block that provides an Embedded MATLAB® function performing a fixed-point operation 250 having one or more fixed-point typing rules of the present invention.

The graphical model 235 of the present invention can be of any type and/or form. The graphical modeling tool 230 may provide any type of tools, libraries, and configuration mechanisms to graphically create and/or edit a graphical model 235. In an exemplary embodiment, the graphical model 235 may comprise a block diagram model provided by the Simulink® environment of The MathWorks, Inc. For example, the block diagram model 235 may comprise a series of different type of blocks arranged in a desired manner and connected via connection lines to represent signal values traversing the blocks. The graphical model 235 may comprise any type of element to form a graphical model, such as connectors, blocks, or any other graphical form and representation of functionality supported by the graphical modeling tool 230. One ordinarily skilled in the art will recognize and appreciate the various forms of graphical models, and the elements and content thereof.

In other embodiments, the graphical modeling tool 230 includes fixed-point capabilities to enable the design of graphical models 235 representing design control and signal processing systems that will be implemented using fixed-point arithmetic. In the exemplary embodiment of Simulink®, the graphical modeling tool 230 may include Simulink® Fixed-Point to provide or enable the fixed-point capabilities and design of the graphical model 235. The graphical modeling tool 230 enables fixed-point simulation via the graphical model 235 along with fixed-point code generation, such as via the code building tool 290 of the present invention. Additionally, the graphical modeling tool 230 allows for the control of fixed-point data types and scaling of fixed-point data in the graphical model 235. In some embodiments, the graphical model 235 may be designed, configured or constructed via any combination of graphical and/or textual constructs to provide or represent a fixed-point operation 250'. In other embodiments, the graphical model 230 may include one or more executable instructions 225 to provide a fixed-point operation 250'.

In some embodiments, the graphical model 235 incorporates, references, or otherwise uses the executable instructions 225 provided by the programming tool 220. In an exemplary embodiment, MATLAB® is integrated and used with Simulink® to provide an environment combining technical computing of MATLAB® with the graphical modeling of Simulink®. The graphical model 235 can include any elements provided for creating a graphical model 235 by the graphical modeling tool 230, such as any elements of a block diagram model known by those ordinarily skilled in the art, and can include executable instructions 225 that may be provided by the programming tool 220. For example, the graphical model 235 may comprise a block diagram model with blocks communicating with a workspace environment of the programming tool 220, such as Simulink® communicating with a MATLAB® workspace.

In one embodiment, the graphical modeling tool 230 may be able to simulate or execute the graphical model 235. For example, in the exemplary embodiment of Simulink®, the graphical modeling tool 230 has an environment that provides for the simulation and debugging of the graphical model 235. Additionally, in other embodiments, the graphical modeling tool 230 may generate code of executable instructions representing the graphical model 235 to compile and build for executing on a target hardware platform and/or operating system. The graphical modeling tool 230 may generate code of executable instructions for a hardware implementation of a model. As such, the graphical model 235 can be processed into an executable form to simulate, run, or otherwise execute the design, functionality, and/or operations represented by the graphical model 235. An executable form of the graphical model 235 may be any type and/or form of representation of the graphical model 235 that can be simulated, run or executed, and may comprise any graphical and/or textual forms, interpreted languages or scripts, or programming languages, or any combination thereof. In some embodiments, the executable form of the graphical model 235 may comprise any type of interpreted language, such as MATLAB®. In other embodiments, the executable form of the graphical model 235 may comprise any type of executable instructions, such as scripts, libraries, code, or compiled executables.

The technical computing and graphical modeling environment 120 may include the representation building tool 290 for generating representations and building an executable form of the graphical model 235 and/or executable instructions 225. In some embodiments, the representation building tool 290 may be used to generate fixed-point code for a fixed-point design of a graphical model 230 or fixed-point operations provided by executable instructions 225. The representation building tool 290 may include a code generator 295, such as the automatic code generator of Real-Time Workshop® from The MathWorks, Inc. of Natick, Mass. The code generator 295 generates source code from a graphical model 235 and/or executable instructions 225 to translate the functionality of the graphical model 235 and/or executable instructions 225 into a program that may be designed to run on any processor, operating system, or otherwise customized to run on a specific target hardware platform, such as a fixed-point processor. In one embodiment, the code generator 295 generates a second set of executable instructions or code for the executable instructions 225 provided via the programming tool 220. Alternatively, the in memory representation generator 297 may be used to generate an in memory representations of fixed point operations rather than generated code. The in memory representation may be used in emulation as described above.

Additionally, the representation building tool 290 includes a partial evaluator 275 for performing the partial evaluation techniques of the present invention, for example, when generating representations (such as generated code or in memory representations) for fixed-point operations 250, 250'. The partial evaluator 275 may comprise software, hardware, or any combination of software and hardware. In one embodiment, the partial evaluator 275 is implemented in C or C++ programming language, and in further embodiments, the partial evaluator 275 during the evaluation process or execution may be run via another language, such as Embedded MATLAB® provided by The MathWorks, Inc. of Natick, Mass. In some embodiments, the partial evaluator 275 is implemented in MATLAB®, and in other embodiments, may use any of the libraries or APIs of MATLAB®. As one ordinarily skilled in the art will appreciate the partial evaluator 275 of the present invention may be implemented with any type and/or form of language, such as a programming language, scripting language, or otherwise.

Partial evaluation is often a technique to partially evaluate or execute a program when only some of its input data is available or known at the time of applying the technique. That is, in one embodiment, the partial evaluator 275 takes a program, for which some of the inputs are known prior to processing, and evaluates or executes as much of the program as possible. In another embodiment, the partial evaluator 275 of the present invention determines from the known fixed-point data types of input to a fixed-point operation 250 any fixed-point data types of resulting output of the fixed-point operation 250. In practicing the operations of the present invention as described herein and as those ordinarily skilled in the art will appreciate, partial evaluation may be any type and/or form of static analysis, and in some embodiments, may include any analysis that takes use of static properties of the fixed-point operation 250 and generates code representing the fixed-point operation 250 based on the static properties.

The partial evaluator 275 may take as input either executable instructions 225 and/or a graphical model 235 representing a fixed-point operation 250, 250' and generate representations of the pre-computation of one or more known or static inputs to the fixed-point operation 250, 250' at the time of representation generation. The partial evaluator 275 is given as input the executable instructions 225 or graphical model 235 along with any known or static input data, such as the fixed-point data types of the operands of the fixed-point operation 250. Then, the partial evaluator 275 generates representations that when given the remaining input data, such as the dynamic data not known at generation, will yield the same result that code for the fixed-point operation 250, 250' would have produced given both known and unknown inputs. In one embodiment, the partial evaluator 275 takes as input the fixed-point data types of the input to the fixed-point operation 250, 250' and determines the fixed-point data type or types of resulting output from the fixed-point operation 250, 250'. In some embodiments, the partial evaluator 275 uses a fixed-point typing rule 330 to determine the fixed-point data type of output based on the data types of the input.

The programming tool 220, graphical modeling tool 230, and representation building tool 290 and any portion thereof, can comprise an application, module, service, computer program, software component, library, function, process, task, or any other type and/or form of executable instruction which is designed to and capable of executing the functionality of the present invention as described herein. Additionally, programming tool 220, graphical modeling tool 230, and representation building tool 290, may be configured to and capable of running any of the modules, libraries or software components of the MATLAB® and/or Simulink® product family. As such, the technical computing and graphical modeling environment 120 may have all or a portion of the software components of MATLAB® and/or Simulink® installed on the computing device 102, or alternatively, accessible from another computing device on a network.

In FIG. 2A, although the programming tool 220, graphical modeling tool 230, and representation building tool 290 are illustrated as separate tools, one ordinarily skilled in the art will recognize and appreciate that any combination or all of these tools 220, 230 and 290 may be combined into a single application, or otherwise tightly integrated to present a single application in performing the operations of the present invention as described.

Figure 2B:
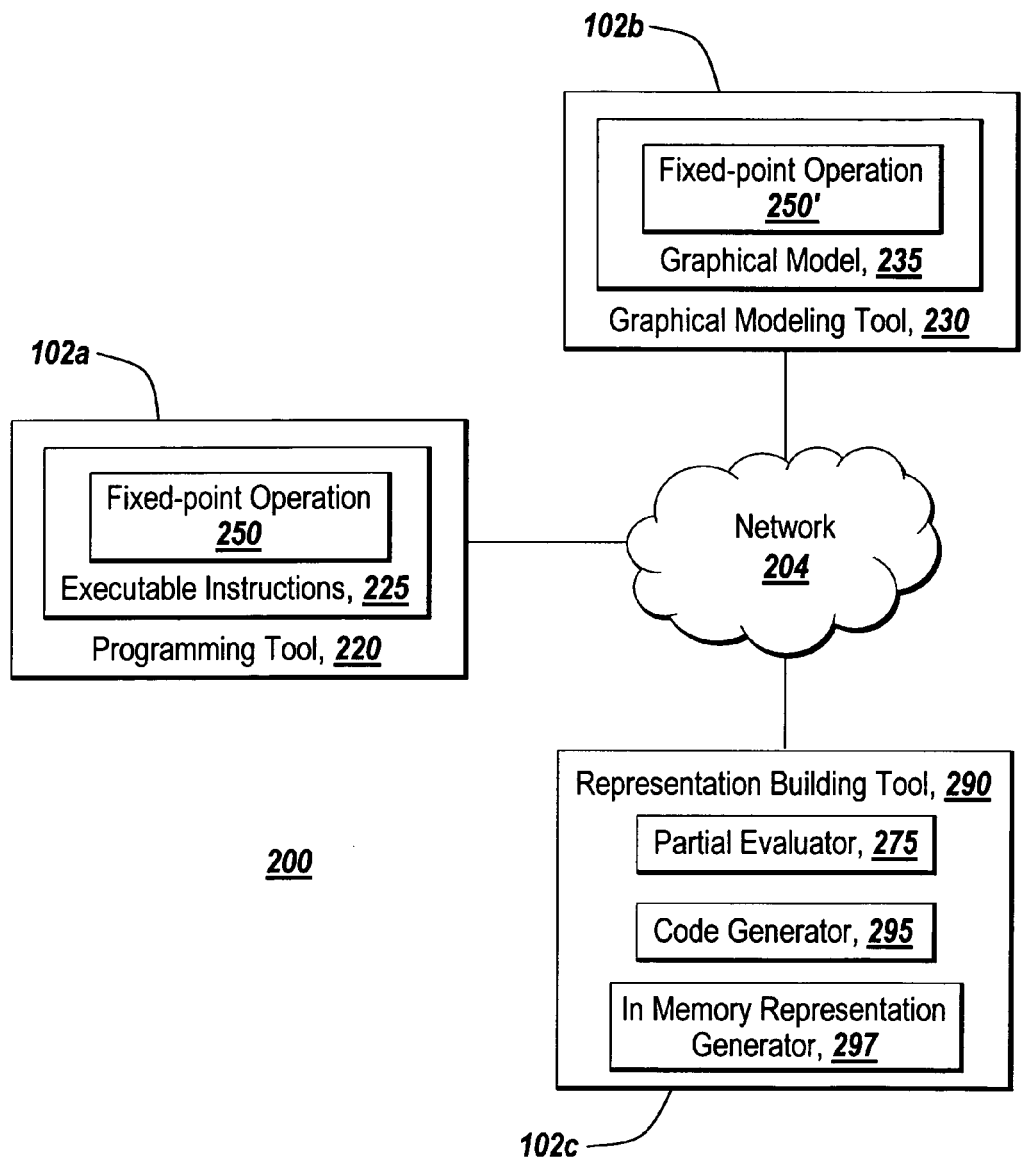
FIG. 2B is a block diagram of another illustrative technical computing and graphical modeling for practicing an embodiment of the present invention in a network environment.

FIG. 2B depicts another environment suitable for practicing an illustrative embodiment of the present invention, wherein portions of the present invention are distributed in a network environment. In a broad overview, a system 200 depicts a network 204 environment for running portions of the technical computing and graphical modeling environment 120 of the present invention on multiple computing devices 102a, 102b and 102c. The system 200 includes multiple computing devices 102a, 102b, and 102c connected to and communicating over a network 204. The programming tool 220, graphical modeling tool 230, and representation building tool 290 can be capable of and configured to communicate to each other over the network 204 by any suitable means and/or mechanisms. In some embodiments, the technical computing and graphical model environment 120 may use the MATLAB® Distributed Computing Toolbox and Distributed Computing Engine to distribute and process any portions of the operations of the present invention described herein.

The network 204 can be a local area network (LAN), such as a company Intranet, a metropolitan area network (MAN), or a wide area network (WAN) such as the Internet. In one embodiment (not shown), the network 204 comprises separate networks, which may be of the same type or may be of different types. The topology of the network 204 over which the computing devices 102a, 102b, 102c communicate may be a bus, star, or ring network topology. The network 204 and network topology may be of any such network 204 or network topology capable of supporting the operations of the present invention described herein.

The computing devices 102a, 102b, and 102c can connect to the network 204 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

The network 204 and network connections may include any transmission medium between any of the computing devices 102a, 102b, and 102c such as electrical wiring or cabling, fiber optics, electromagnetic radiation or via any other form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a computing device 102a, 102b, and 102c to practice the operations of the present invention as described herein.

Each of the computing devices 102a, 102b, and 102c may be configured to and capable of running any portion of the technical computing and graphical modeling environment 120. The technical computing and graphical modeling environment 120 and/or any portion thereof, such as the programming tool 220, graphical modeling tool 230, and representation building tool 290 can be capable of and configured to operate on the operating system that may be running on any of the computing devices 102a, 102b, and 102c. Each computing device 102a, 102b, and 102c can be running the same or different operating systems. Additionally, programming tool 220, graphical modeling tool 230, and code building tool 290 can be capable of and configured to operate on and take advantage of different processors of any of the computing devices 102a, 102b, and 102c. One ordinarily skilled in the art will recognize the various combinations of operating systems and processors that can be running on any of the computing devices.

Figure 2C:
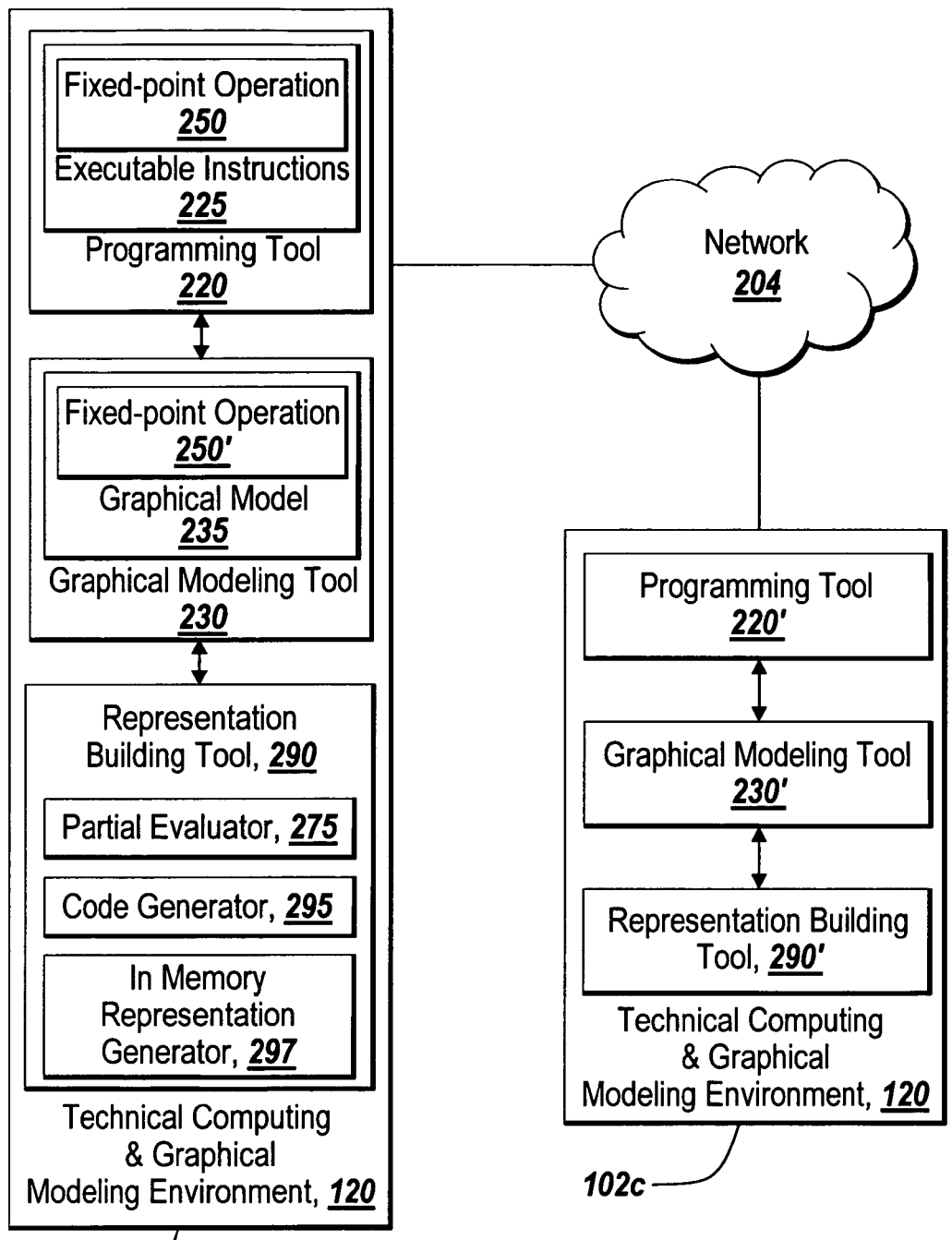
FIG. 2C is a block diagram of another illustrative technical computing and graphical modeling for practicing an embodiment of the present invention in a distributed environment.

FIG. 2C depicts another illustrative environment of an embodiment of the present invention, wherein portions of the present invention are practiced in a client/server architecture in a network environment. In a broad overview, the illustrative technical computing and graphical modeling environment 120 of the present invention includes a client computing device 102a connected to and in communication with a server computing device 102c over a network 204. The programming tool 220, graphical modeling tool 230 and/or representation building tool 290, can be capable of and configured to have respective portions run on each of the client 102a and the server 102c. In one embodiment, the programming tool 220 may have a first portion running on the client 102a and a second portion 220' running on the server 102c. For example, the programming tool 220 may have a client portion 220 on the client 102a for providing and displaying the executable instructions 225, and a server portion 230' on the server 102c that may include application functionality and other processing, such as storing and/or retrieving portions of the executable instructions 225 from a database. Likewise, in other embodiments, the graphical modeling tool 230 may also have a client portion 230 and a server portion 230', and the representation building tool 290, a client portion 290 and a server portion 290'. One ordinarily skilled in the art will recognize and appreciate how the programming tool 220, graphical modeling tool 230, and/or representation building tool 290 may be capable of and configured to execute with a client portion and a server portion in a client/server architecture.

Additionally, the programming tool 220, graphical modeling tool 230, and/or representation building tool 290 may be deployed such that portions of the graphical model 235 and/or executable instructions 225 may execute on certain portions of the network 204 and/or on certain computing devices 102a, 102b, or 102c. For example, some functionality of the graphical model 235 and/or executable instructions 225 may be time critical or sensitive, and therefore may be targeted to execute on a computing device 102a, 102b or 102c, and/or a segment or portion of the network 204 with desired performance and/or operating characteristics. Other functionality of the graphical model 235 and/or executable instructions 225 may not be time-sensitive and may be targeted to be deployed to any computing device 102a, 102b, and 102c available on the network 204.

In summary, the programming tool 220, graphical modeling tool 230, and representation building tool 290 may be deployed across a wide range of different computing devices, different operating systems, and different processors. Furthermore, the programming tool 220, graphical modeling tool 230, and representation building tool 290, may be deployed in various distributed and/or client/server environments in various network topologies and configurations.

Figure 3A:
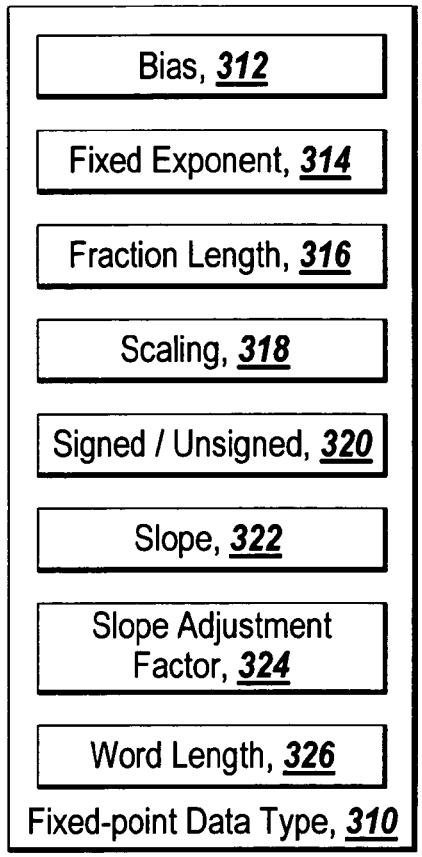
FIG. 3A is a block diagram illustrating a fixed-point data type for practicing an embodiment of the present invention.

In one aspect, the partial evaluation techniques of the present invention are related to inputs having a known or static fixed-point data type. For example, any operand of the fixed-point operation 250 in the executable instructions 225 or graphical model 235 may comprise a fixed-point data type. FIG. 3A illustrates a fixed-point data type 310 and the various properties, characteristics, or attributes that may be used to define or specify a data type representing a fixed-point number. In brief overview, a fixed-point data type 310 may be defined, specified, or configured by a bias 312, a fixed exponent 314, fraction length 316, scaling 318, signed/unsigned 320, slope 322, slope adjustment factor 324, and word length or number of bits 326. In one embodiment, the fixed-point data type 310 may be specified via the MATLAB® programming language, and additionally, may be specified in an object-oriented manner, such as via the numerictype object of the Fixed-Point Toolbox. As such, the properties of the fixed-point data type 310 may be set via corresponding properties of the numerictype object.

The bias 312 property defines a value that is part of the numerical representation used to interpret a fixed-point number, such as in the following representation:

real-world value=(slope×integer)+bias

Along with the slope, the bias forms the scaling of the number. The slope can be expressed as:

slope=fractionalslope×2^{fixedexponent}

As such, the fixed exponent 314 property is also part of the numerical representation used to express a fixed-point number and is included in the exponential portion of the "2" operand in the slope expression. The fraction length 316 property may be any integer value and represents the distance from the least significant bit (LSB) to the binary point.

The fixed-point scaling 318 property of a fixed-point data type 310 may be set, by way of example of the Fixed-Point Toolbox of MATLAB®, to a value indicating the scaling is 1) binary point, 2) slope bias, or 3) an integer. A binary point value indicates the scaling of the fixed-point data type 310 is defined by the fraction length 316. A slope bias value indicates the scaling of the fixed-point data type 310 is defined by the slope 322 and bias 312. An integer scaling setting of the fixed-point scaling 318 property indicates that the binary point is understood to be at the far right of the word making the fraction length zero. The signed/unsigned property 320 indicates whether the fixed-point number is zero or positive (unsigned) unsigned or negative (signed). The slope 322 property defines a value for the slope that is part of the numerical representation used to express a fixed-point number. Along with the bias 312, the slope forms the scaling of a fixed-point number. The slope adjustment factor 324 provides a value that is equivalent to the fractional slope of a fixed-point number. The word length 326 property is the word length, in bits, of the stored integer value of a fixed-point number, and can be any positive integer value.

Although the fixed-point data type 310 of the present invention are illustrated and generally described with a set of properties and values, one ordinarily skilled in the art will recognize and appreciate that a fixed-point data type 310 may be specified with other properties and values indicating the numerical representation used to interpret a fixed-point number. Furthermore, the fixed-point data type 310 may be specified or configured programmatically, such as via an API call or via methods and properties of an object. For example, the fixed-point data type 310 of a variable, argument, or operand of a fixed-point operation 250 may be set via the executable instructions 225 of the programming tool 220. Also, the fixed-point data type 310 may be specified or configured graphically via any type and/or form of user interface mechanism, such as a user interface of the Fixed-Point Toolbox for Simulink® in an exemplary embodiment of the present invention.

In another aspect, the present invention relates to using fixed-point typing rules to determine the data type of a result or output of a fixed-point operation 250, such as an intermediate result related to evaluation of an input or operand of the operation 250, or a resulting output of the operation. FIG. 3B illustrates an example fixed-point typing rule 330 in association with a fixed-point operation 250 to be evaluated or processed by the partial evaluation techniques of the present invention. In brief overview, the fixed-point typing rule 330 may be associated with, included with or form a part of the fixed-point operation 250, and may use, one or more fixed-point typing rule parameters 331. The fixed-point typing rule parameters 331 may specify one or more properties or values related to determining a fixed-point data type 310 of any intermediate or resulting output of the fixed-point operation 250.

By way of example and as illustrated in FIG. 3B, the fixed-point operation 250 and fixed-point typing rule 330 in one embodiment may be implemented in an integrated manner via the executable instructions 225. That is, the fixed-point typing rule 330 is programmed or implemented as part of the fixed-point operation 250. As such, the fixed-point typing rule 330 may be expressed as a program or function, such as an M-function in the MATLAB® programming tool. A user, programmer or developer may implement a custom fixed-point typing rule 330 as part of the implementation of the fixed-point operation 250. For example, the fixed-point operation 250 may execute or call a plus function, which in the embodiment of MATLAB® performs matrix addition of two matrices having one or more fixed-point data types. In the implementation of the plus function as shown in the instructions 225 of FIG. 3B, an example of a fixed-point typing rule 330 is the verification that scaling is not slope-bias for any of the fixed-point typing rule parameters 331 provided via the inputs "a0" and "b0", and setting the fixed-point typing rule parameter 331 to a desired value, such as the bias parameter.

Another example of a fixed-point typing rule 330 is obtaining the best precision numericType for the input "b0".

As illustrated by FIG. 3B, a fixed-point typing rule 330 provides for one or more characteristics, attributes, or properties for specifying, defining or configuring a fixed-point data type of a result, intermediate or otherwise, of a fixed-point operation 250. In one aspect, the fixed-point rule 330 of the present invention may be implemented as code for or in any portion of the fixed-point operation 250. In other embodiments, the fixed-point typing rule 330 may be implemented separately from the fixed-point operation 250 but executed during evaluation or execution of the fixed-point operation 250. In some embodiments, the fixed-point typing rule 330 comprises logic, function, and/or operations of executable instructions 225 for determining or providing for the fixed-point data type of a result or output of a fixed-point operation 250.

The fixed-point typing rule 330 may be configured, defined, or customized for any type of fixed-point related operation 250, such as any of the functions available with Embedded MATLAB® of The MathWorks, Inc. In one embodiment, the present invention enables a user to implement any of the Embedded MATLAB® functions with user implemented fixed-point typing rules 330 which provide the fixed-point data types for any output of the fixed-point operation 250. Any of the fixed-point functions 250 of Embedded MATLAB® may be related to 1) bitwise functions, 2) constructor and property Functions, 3) data manipulation functions, 4) data type functions, 5) data quantizing functions, 6) element-wise logical operator functions, 7) math operation functions, 8) matrix manipulation functions, 9) plotting functions, 10) radix conversion functions, 11) relational operator functions, 12) statistics functions, 13) subscripted assignment and reference functions, and 14) any functions related to the fi, fimath, fipref, numerictype, and quantizer objects. For example, in the embodiment of Embedded MATLAB®, any one or more of the following M-functions in one or more libraries may be modified to use a desired fixed-point typing rule 330: abs.m, conj.m, eps.m, eq.m, ge.m, gt.m, int.m, int16.m, int32.m, int8.m, intmax.m, intmin.m, isfinite.m, isnumeric.m, le.m, lt.m, le.m, lt.m, max.m, min.m, minus.m, mtimes.m, ne.m, plus.m, pow2.m, range.m, rdivide.m, realmax.m, realmin.m, repmat.m, reshape.m, sign.m, stripscaling.m, sum.m, times.m, uint16.m, and uint32.m. These functions correspond to functions available in MATLAB® but written or provided in a form to encode or implement the fixed-point typing rule 330 based on the fixed-point typing rule parameters 331. Although the fixed-point operation 250 may, at times, be described herein in relation to a product or sum type of fixed-point operation, the fixed-point operation may comprise any type of desired functionality, such as described above for any of the Embedded MATLAB® functions, or any other desired functionality.

Figure 3C:
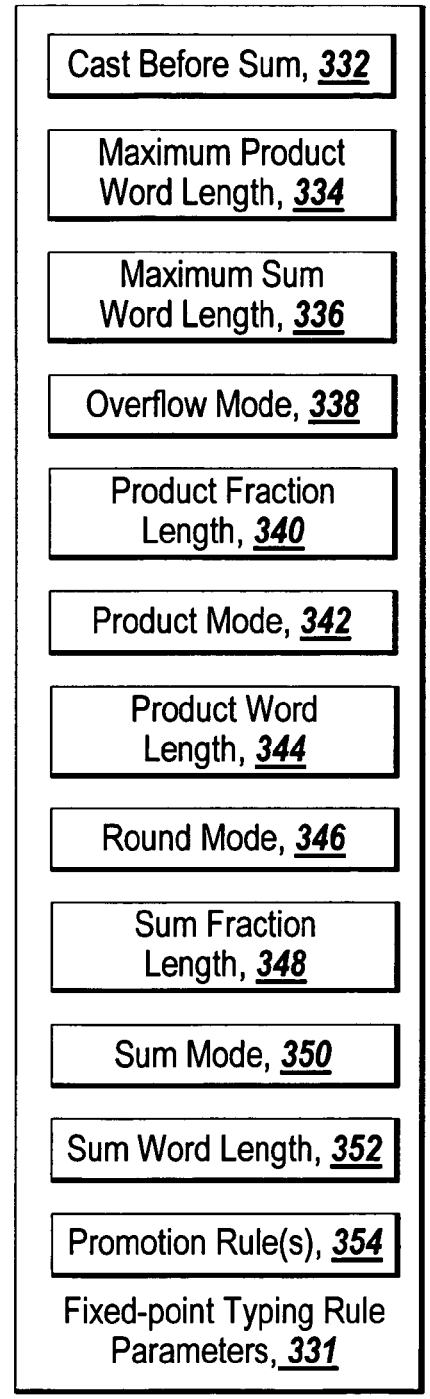
FIG. 3C is a block diagram illustrating fixed-point typing rules parameters for practicing an embodiment of the present invention.

In another aspect, the fixed-point typing rule 330 may have one or more parameters providing fixed-point type related properties for a fixed-point typing rule 330 to consider, process, evaluate or determine a fixed-point data type 310 of an intermediate or resulting output of the fixed-point operation 250. FIG. 3C depicts an illustrative set of one or more fixed-point typing rule parameters 331 that may be used by a fixed-point typing rule 330 in practicing the operations of the presenting invention. In brief overview, and by way of example, the fixed-point typing rule parameters 331 may include one or more of the following rules: 1) cast before sum 332, 2) max product word length 334, 3) max sum word length 336, 4) overflow mode 338, 5) product fraction length 340, 6) product mode 342, 7) product word length 344, 8) round mode 346, 9) sum fraction length 348, 10) sum mode 350, 11) sum word length 352, and 12) one or more promotion rules 354. In one embodiment, the fixed-point typing rule parameters 331 may be specified via MATLAB®, such as via the Fixed-Point Toolbox. For example, the fimath object of MATLAB® may be used to specify these fixed-point typing rules 330.

The cast before sum 332 property of the fixed-point typing rule parameters 331 indicates whether the operands of the fixed-point operation 250 are converted to the sum data type before addition. The max product word length 334 indicates the maximum allowable word length for the product data type, and the max sum word length 336 indicates the maximum allowable word length for the sum data type. The overflow mode 338 indicates how to handle any overflows in computing the fixed-point operation 250. In one embodiment, the overflow mode 338 may be set to use two's complement overflow, which may also be referred to as wrap on overflow. In another embodiment, the overflow mode 338 may be set to indicate to saturate to the maximum or minimum value of the fixed-point range on overflow. The product fraction length 340 property indicates the fraction length in bits of the product data type, and may be set to any positive or negative integer. The product word length 344 is the word length or number of bits of the product data type, and may be specified with a positive integer.

The product mode 342 defines how the product data type is determined. For example, let A and B be real operands of the fixed-point operation 250, with word length and fraction length pairs $[W_a, F_a]$ and $[W_b, F_b]$ respectively. $W_p$ is used to refer to the product data type word length, and $F_p$, the fraction length of the product data type. In one embodiment, the product mode 342 is specified to keep the full precision of the result, and an error is generated if the calculated word is greater than the max product word length 334. In full precision mode, $W_p=W_a+W_b$, and $F_p=F_a+F_b$. In another embodiment, product mode 342 is specified to keep the least significant bits. In this mode, the product data type word length is specified by the product word length 344 property, and the fraction length is set to maintain the least significant bits of the product. As such, $W_p$=the product word length 344, and $F_p=F_a+F_b$. In an additional embodiment, the product mode 342 is specified to keep the most significant bits. In this mode, the product data type word length is specified by the product word length 344 property, and the fraction length is set to maintain the most significant bits of the product. As such, overflow is prevented but precision may be lost. In this mode, $W_p$=the product word length 344, and $F_p=W_p-((W_a+W_b)+(F_a+F_b))$. In a further embodiment, the product mode 342 is provided such as to specify the precision of the product, such as specifying both the word length and fraction length of the product data type. In this mode, $W_p$=the product word length 344, and $F_p$=the product fraction length 340.

The round mode 346 of the fixed-point typing rule 330 indicates the rounding mode for a fixed-point operation 250. In one embodiment, the round mode 346 is set to round toward positive infinity, and in another embodiment, toward negative infinity. In some embodiments, the rounding mode 346 indicates to round toward zero. In further embodiments, the rounding mode 346 is set to round to the nearest value, with ties rounding to even numbers in some cases, or the number towards positive infinity in other cases. The sum fraction length 348 indicates in bits the fraction length of the sum data type and may be any positive or negative integer. The sum word length 352 indicates the word length or number of bits of the sum data type, and may be a positive integer.

The sum mode 350 defines how the sum data type is determined. For example, let A and B be real operands of the fixed-point operation 250, with word length and fraction length pairs $[W_a, F_a]$ and $[W_b, F_b]$ respectively. $W_s$ is used to refer to the sum data type word length and $F_s$, the fraction length of the sum data type. In one embodiment, the sum mode 352 is specified to keep the full precision of the result, and an error is generated if the calculated word is greater than the max sum word length 336. In full precision mode, $W_s$=integer length+$F_s$, and $F_s$=max $(F_a, F_b)$. The integer length may be specified as the max($W_a-F_a$, $W_b-F_b$)+ceil(log 2(NumberofSummands)), and, in the case of two summands, max($W_a-F_a$, $W_b-F_b$)+1. In another embodiment, sum mode 350 is specified to keep the least significant bits. In this mode, the sum data type word length is specified by the sum word length 352 property, and the fraction length is set to maintain the least significant bits of the sum. As such, $W_s$=the sum word length 352, and $F_s$=max($F_a, F_b$). In an additional embodiment, the sum mode 350 is specified to keep the most significant bits. In this mode, the sum data type word length is specified by the sum word length 352 property, and the fraction length is set to maintain the most significant bits of the product. As such, overflow is prevented but precision may be lost. In this mode, $W_s$=the sum word length 352, and $F_s$=$W_s$−integer length. In a further embodiment, the sum mode 350 is provided such as to specify the precision of the sum, such as explicitly via both the word length and fraction length of the sum data type. In this mode, $W_s$=the sum word length 352, and $F_s$=the sum fraction length 348.

In some embodiments, the fixed-point typing rule parameters 331 are specified with one or more promotion rules 354. Operations with at least one fixed-point operand may use rules 354 for selecting the type of the intermediate result for that operation. For example, in the action statement c=a+b where a or b is a fixed-point number, an intermediate result type for a+b is first chosen before the result is calculated and assigned to c. Promotion rules 354 may be used for selecting the numeric types used to hold the results of fixed-point operations 250. These promotion rules 354 may be specified to provide good computational efficiency with reasonable usability. Promotion rules 354 can come in many forms which will be described by way of several examples. For example, a promotional rule 354 may treat any fixed-point number with a slope of 1 and a bias of 0 as an integer. Also, integers as operands in fixed-point operations 250 may be treated as fixed-point numbers with the same word size and slope equal to 1 and bias of 0.

In some embodiments of the promotion rules 354, when both operands are fixed-point numbers, the number of bits in the result type is the maximum number of bits in the input types, or in other embodiments, the integer word size for the target processor. In one embodiment, when one operand is of type double in a fixed-point operation 250, the result type is double. In this case, the fixed-point operand may be cast to a type double, and the calculation performed. Likewise, in another embodiment, when one operand is of type single in a fixed-point operation 250, the result type is single. The fixed-point operand may be cast to a single prior to performing the calculating and assigning the value to the output. In some cases, if any one of the operands of the fixed-point operation 250 is signed, the result type may be signed, and in other cases, unsigned. In other cases, if both operands are signed, then the result type is signed. In other embodiments, regardless if any of the operands are signed or unsigned, the resulting type may be specified to be either signed or unsigned.

In some embodiments of the promotion rules 354, if all of the operands of the fixed-point operation 250 are of a fixed-point data type 310 then the intermediate result is a fixed-point data type 310. The resulting fixed-point data type 310 may be chosen via operator-specific rules. For example, the resulting output data type for addition and subtraction is chosen so that the maximum positive range of either input can be represented in the output while preserving maximum precision. The output type for multiplication and division fixed point operations may be chosen to yield a more efficient code implementation. In one embodiment, the slope for the result type of the product of two fixed-point numbers is the product of the slopes of the operands. Likewise, the slope for the result type of the quotient for dividing two fixed-point numbers is the quotient of the slopes of the operands. For relational type fixed-point operations, such as >, <, >=, <=, ==, −=, !=, < >, the promotion rules 354 may specify the operands are converted to a common bias before comparison. As such, the promotion rules 354 may specify one or more rules for conversion. For example, a more precise operand may be converted to the bias of the least precise operand.

The promotion rules 354 may specify the number of bits for the resulting type based on any combination of number of bits of the operands of the fixed-point operation 250. For example, the number of bits for the result type may be set to the number of bits of any one of the operands. In another example, the number of bits for the result type may be specified by the operand with either the largest number of bits or the smallest number of bits. In a further example, the number of bits for the result type may be the sum of the number of bits of the operands. Additionally, the promotion rules 354 may specify any type of bit adjustment. For example, a multiplicative adjustment may be specified to set the number of bits associated with a multiply operation by some factor of the number of bits of an operand. In a similar manner, an additive adjustment may be specified to provide guard bits to prevent overflow. In another embodiment, the promotion rules 354 may specify one or more allowable number of bit values to force the computed result value to fit into a size supported by a target processor. The promotion rules 354 may also specify slope and/or bias additive and multiplicative adjustments based on the slope and/or bias of any operands.

The fixed-point typing rules 330 of the present invention may be defined, specified, or configured by any suitable means and/or mechanisms. In one embodiment, the fixed-point typing rule 330 is specified programmatically via application programming interface (API) calls or via the use of objects provided by the technical computing and graphical modeling environment 120. In other embodiments, the fixed-point typing rule 330 is configured via any type and/or form of user interface mechanism, such as a command line or a graphical user interface design and constructed to receive user input to define a fixed-point typing rule 330. Additionally, any fixed-point typing rule parameters 331 used by a fixed-point typing rule 330 may be accessed, referenced or obtained by any suitable means and/or mechanisms. In one embodiment, the fixed-point typing rule parameters 331 may be accessed through a function, method or API call in the programming language used to implement the fixed-point operation 250, such as via executable instructions 225. In one embodiment, a first API call may be used to access a selected one of the fixed-point typing rule parameters 331, and a second API call may be used to obtain the value of the selected fixed-point typing rule parameter. Furthermore, a value of any fixed-point typing rule parameter 331 may be configured via any type and/or form of user interface mechanism, such as an API, a command line or a graphical user interface design and constructed to receive user input to set or modify a value a fixed-point typing rule parameter 331.

Although the fixed-point typing rule 330 and fixed-point operation 250 are generally discussed in terms of operands, such as a variable or input parameter, an operand may also comprise any element of a graphical model 235, such as a signal or an attribute of a signal. That is the element of the graphical model 235, such as a signal, acts as an operand or otherwise provides input to the fixed-point operation 250. As such, the fixed-point typing rule 330 may apply its rules set based on any of properties of the signal related to the representation of the fixed-point operation 250' in the graphical model 235. For example, a signal traversing a graphical model 235 may carry a value for or otherwise represent a fixed-point data type 310. Any of the properties of the fixed-point data type 310 of the signal, such as number of bits, slope, bias, or signed/unsigned, may be used to determine the resulting output type. Additionally, the result or output may take the form of an element of the graphical model 235, such as a signal output from a block of a block diagram model or to another system.

Furthermore, the fixed-point typing rule 330 may be incorporated in or otherwise associated with the fixed-point operation 250, or any portion thereof. In one embodiment, the fixed-point typing rule 330 is encoded, programmed, or implemented in or as part of the fixed-point operation 250 as illustrated in FIG. 3B. For example, a function performing any type of fixed-point operation 250 in a set of executable instructions 225 may include executable instructions that perform a fixed-point typing rule 330 by obtaining and/or evaluating the values of one or more fixed-point typing rule parameters 331. In another embodiment, the fixed-point typing rule 330 may be associated with any input or operand of the fixed-point operation 250, which may be represented by any type of variable or object provided via the programming tool 220 or graphical modeling tool 230. For example, in the exemplary embodiment of MATLAB, a fi or fimath object may be used to provide an input or operand for a fixed-point operation 250. In addition to specifying the fixed-point data type 310 of the operation, the object may also carry or specify the fixed-point typing rule 330 desired to be used. In the case of multiple operands specifying multiple fixed-point typing rules 330, there may be any type and/or form of suitable order of preference or priority to resolve any conflicts between the fixed-point typing rules 330.

Figure 4A:
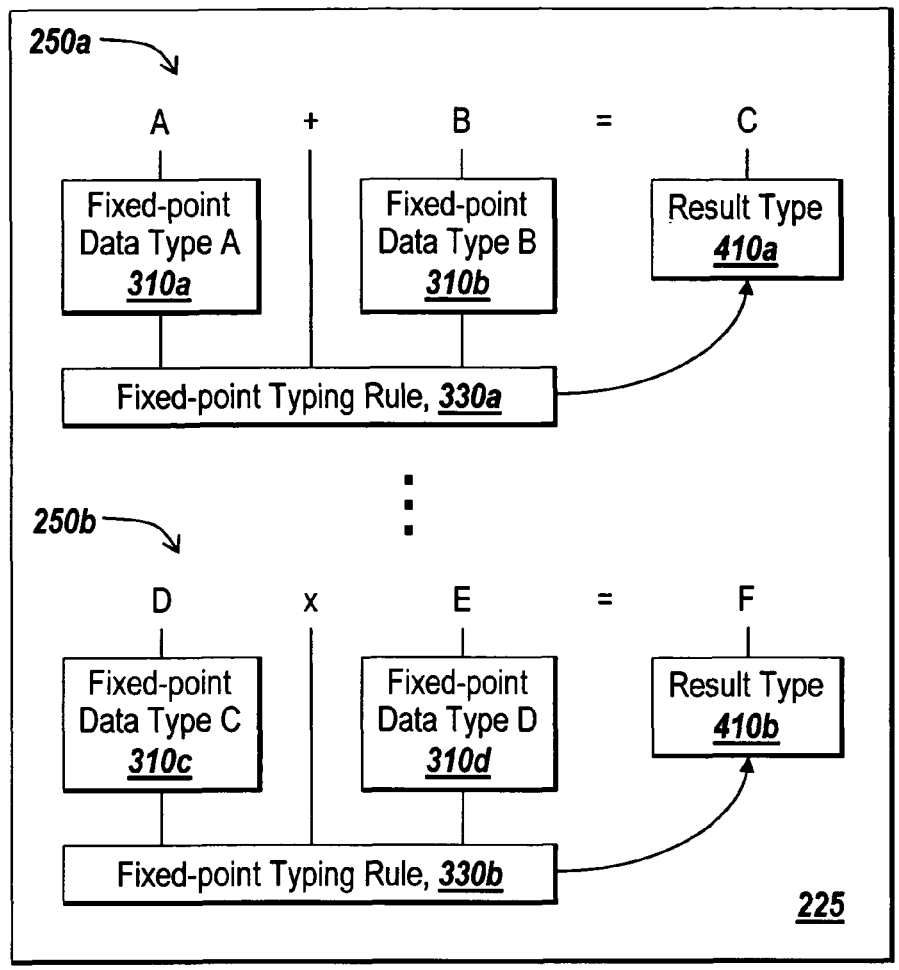
FIG. 4A is a block diagram model of executable instructions having fixed-point operations for practicing an embodiment of the present invention.
Figure 4B:
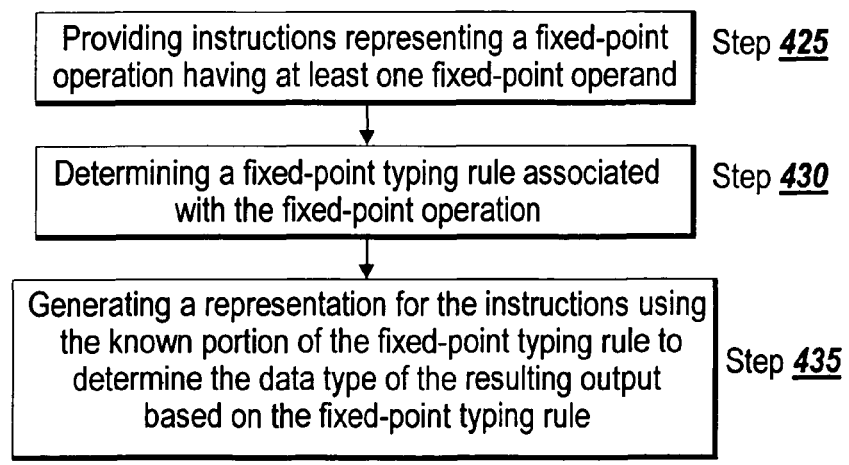
FIG. 4B is a flow diagram depicting an illustrative method of the present invention for generating code for the fixed-point operations illustrated in FIG. 4A using partial evaluation techniques.

In one aspect, the present invention relates to applying a partial evaluation technique to evaluating a fixed-point operation, such as a fixed-point operation 250 represented or performed by a set of executable instructions 225. Referring now to FIGS. 4A and 4B, an illustrative embodiment of the partial evaluation techniques of the present invention will be discussed. FIG. 4A depicts a set of executable instructions showing an illustrative representation of a fixed-point operation 250. FIG. 4B depicts an illustrative method 420 of practicing the partial evaluation technique of the present invention. Although the illustrative method 420 may be described in conjunction with an illustrative product or sum type of fixed-point operation 250 as shown in FIG. 4A, the fixed-point operation may comprise any type of desired functionality as previously described.

In brief overview of FIG. 4A, the set of executable instructions 225 provide a first fixed-point operation 250a and a second fixed-point operation 250b. The fixed-point operation 250a provides a sum operation between two operands A and B to provide an output of C. The A operand has a fixed-point data type 310a and the B operand has fixed-point data type 310b. A fixed-point typing rule 330a is associated with the fixed-point operation 250a, such as association via the sum operator or with one or both of the operands A and B. Using the partial evaluation techniques of the present invention, the fixed-point data type 410a of the result is determined for the operation 250a. The fixed-point operation 250b provides a product operation between two operands D and E to provide an output of F. The C operand has a fixed-point data type 310d and the D operand has fixed-point data type 310d. A fixed-point typing rule 330b is associated with the fixed-point operation 250b and is used to determine the resulting fixed-point data type 410b. Referring now to FIG. 4B, at step 425 of illustrative method 420, a set of executable instructions are provided for code generation, such as the illustrative executable instructions 225 of FIG. 4A. In one embodiment, the executable instructions 225 may comprise an interpretive dynamically typed language such as MATLAB®. In other embodiments, the executable instructions 225 may comprise a programming language, such as C, C++, Visual Basic, Visual .NET or Java. In yet a further embodiment, the executable instructions 225 may comprise a scripting language, such as VB Script, Java Script, perl, or awk. The executable instructions 225 may have one or more instructions representing a fixed-point operation 250a-250b. The fixed-point operation 250a-250b may have one or more operands of a fixed-point data type 310a-310b. In one embodiment, the instructions representing the fixed-point operation 250a-250b may comprise a function call. For example, the input parameters to the function call may be passed to or used by the fixed-point operation 250a-250b. In another embodiment, the instructions for the fixed-point operations 250a-250b may be included in a library.

At step 430, the illustrative method 420 determines there is a fixed-point operation 250, or a fixed-point typing rule 330a-330b associated with the fixed-point operation 250a-250b. The fixed-point typing rule 330a-330b may be associated with any portion of the fixed-point operation 250a-250b. In one embodiment, the fixed-point typing rule 330a-330b may be included or implemented in or form a part of the fixed-point operation 250a-250b. In some embodiments, the fixed-point typing rule 330a-330b may be associated with any of the inputs or operands of the fixed-point operation 250a-250b. In one embodiment, an object, variable, or parameter used to represent or provide an operand for the fixed-point operation 250a-250b may include or have a pointer to the fixed-point typing rule 330a-330b. For example, in the exemplary embodiment of MATLAB®, a fi, fimath, or numeric-type object may include or point to the fixed-point typing rule 330a-330b. In other embodiments, the fixed-point typing rule 330a-330b may be associated with the type of operator or operation of the fixed-point operation 250a-250b. For example, a fixed-point typing rule 330a-330b may be associated with a product or sum operator. In additional embodiments, the fixed-point typing rule 330a-330b may be represented by an object or variable and passed as an argument or a parameter to a function call.

In one embodiment, the partial evaluator 275 as part of the code building tool 290 identifies or determines the existence of a fixed-point operation 250a-250b or fixed-point typing rule 330a-330b. In another embodiment, the programming tool 220 may identify or determine there is a fixed-point operation 250a-250b or fixed-point typing rule 330a-330b. In some embodiments, the present invention parses, interprets, or otherwise reads the executable instructions 225 to identify and/or determine the existence of a fixed-point operation 250a-250b. From the identified fixed-point operation 250a-250b, the fixed-point typing rule 330a-330b may be determined. For example, in one embodiment, the fixed-point typing rule 330a-330b may be a set of executable instructions in the representation building tool 290, such as the partial evaluator 275, that has logic to compare the data types of the operands in relation to the operation. In another embodiment, the fixed-point typing rule 330a-330b may be queried, retrieved, or otherwise obtained from a storage location, such as a file or database, or from a memory location, such as a data structure or object, based on the data type of one or more operands and/or type of operator(s). In a further embodiment, any of the variables or objects representing the operand, output, or any inputs, parameters or arguments used by the executable instructions 225 may be traversed, used, or processed to determine and/or obtain the fixed-point typing rule 330a-330b.

At step 435, the illustrative method 420 of the present invention generates a representation (such as code or an in memory representation) for the executable instructions 225 using partial evaluation techniques. Based on the fixed-point typing rule 330a-330b, the method of the present invention determines the fixed-point data types of any of the resulting output of the fixed-point operation 250a-250b. In some embodiments, the method of the present invention determines if there are any portions of the fixed-point operation 250a-250b or fixed-point typing rule 330a-330b based on static or known information associated with any input to the operation 250a-250b. In one embodiment, the illustrative method 420 may be performed to generate a representation in another programming language from the executable instructions 225. For example, the executable instructions 225 may comprise an interpretive dynamically typed language of MATLAB®. As such, any of the output of the fixed-point operation 250a-250b may be a dynamically typed object or variable representing the resulting value(s) of the operation. The code generated from the executable instructions 225 may include C code instructions, such as integer based C code for a fixed-point processor, or in another embodiment, may be byte code, such as Java byte code. Although the values of the output may not be determined prior to running or executing the code, using the partial evaluation technique of the present invention, the data-types of a result or output of the fixed-point operation 250a-250b are determined for the generated representation. This provides a more efficient representation as the resulting data types of the output are reflected in the generated representation.

For example, the fixed-point operation 250a of FIG. 4A provides a sum of two fixed-point operands, each with a fixed-point data type 310a-310b. Although values for the operands A and B of the fixed-point operation 250a may not be known at the time of representation generation, the resulting data type 410 of the output C can be determined. Based on the fixed-point data types 310a-310b of the operands A and B, a resulting data type 410a for the output C is determined via the fixed-point typing rule 330a. For example, the sum mode 350 of the fixed-point typing rule 330a may indicate to keep the least significant bits. As such, the result type 410a may be defined to have a word length or number of bits set to the value of the sum word length property 352 of the fixed-point typing rule 330, and the fraction length of the result type 410a may be specified as the maximum fraction length of the fixed-point data types 310a-310b. Also, the fixed-point typing rule 330a may indicate if any of the operands are signed, then the result type 410a should be signed. Based on the result-type 410a determined by the fixed-point typing rule 330a, a representation is generated to represent the fixed-point operation 250a to provide output C with the result type 410a. In one embodiment, the code may be C representation using integer variables to represent the result type 410a.

In another example, the result type 410a of the product of the D and E operands of the fixed-point operation 250b is evaluated via the fixed-point typing rule 330b, and a representation is generated to represent the fixed-point operation 250b with the output F having the determined result type 410a. The fixed-point typing rule 330b may have a product mode 342 indicating to use full-precision. As such, the fixed-point data type 410b of output C may be specified to have a word length or number of bits equal to the sum of the word lengths of each of the fixed-point data types 310c and 310d of operands D and E. Likewise, the fraction length of the fixed-point data type 410b of output F may be specified as the sum of the fraction lengths of the fixed-point data types 310c and 310d of operands D and E. Accordingly, a representation is generated to represent the fixed-point operation 250b providing the determined result type 410b having the specified word and fraction lengths.

Although illustrative method 420 is generally described above using sum and product type fixed-point operations 250 implemented a fixed-point typing rule 330, one ordinarily skilled in the art will recognize and appreciate that the data type of any result or output may be determined via any type and/of form of fixed-point typing rule for any type of fixed-point operation 250, such as for example, trigonometric functions. Additionally, although FIG. 4B illustrates the data type of a resulting output 410a-410b of fixed-point operations, a result or output of fixed point operation may include any intermediate result those ordinarily skilled in the art will appreciate. For example, operand A of fixed-point operation 250a may comprise an expression of a fixed-point operation, such as the fixed-point operation 250b. As such, operand A may be processed using the partial evaluation techniques of the present invention to determine a data type of a result of the operand. Thus, the result may be an intermediate result related to an operand or input, or may be an output result of the operation.

Figure 4C:
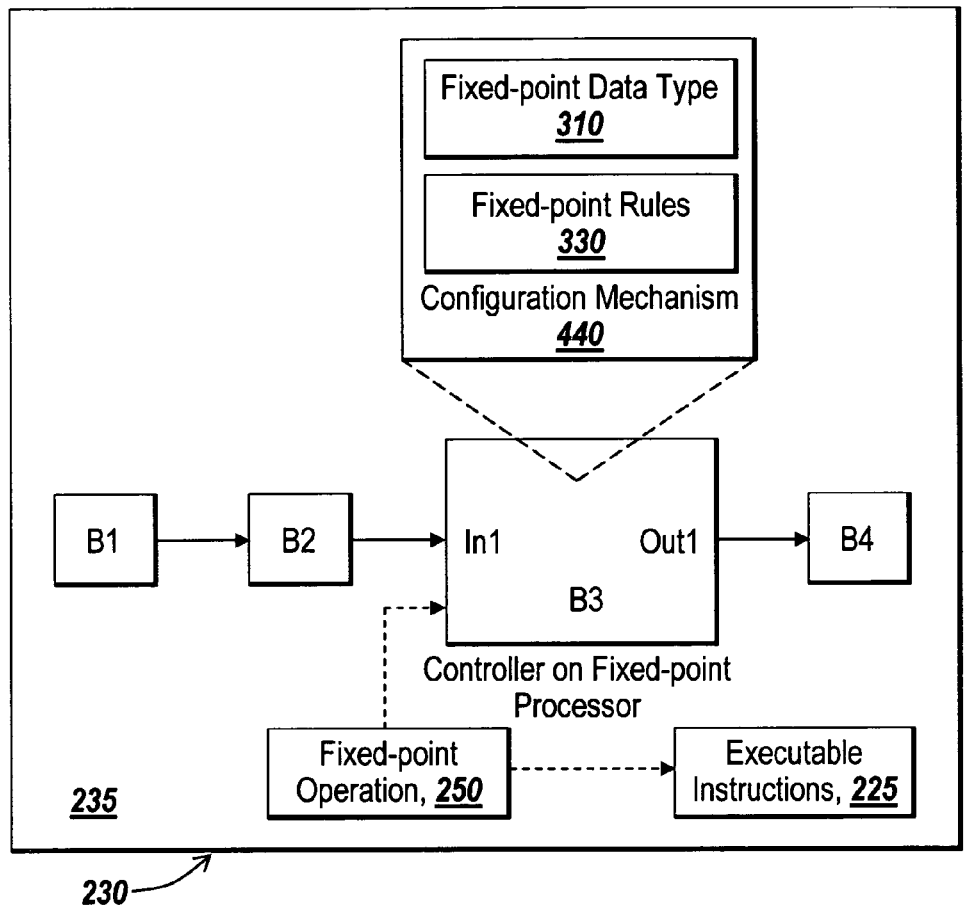
FIG. 4C is a block diagram model of a graphical model comprising fixed-point operations for practicing an embodiment of the present invention.
Figure 4D:
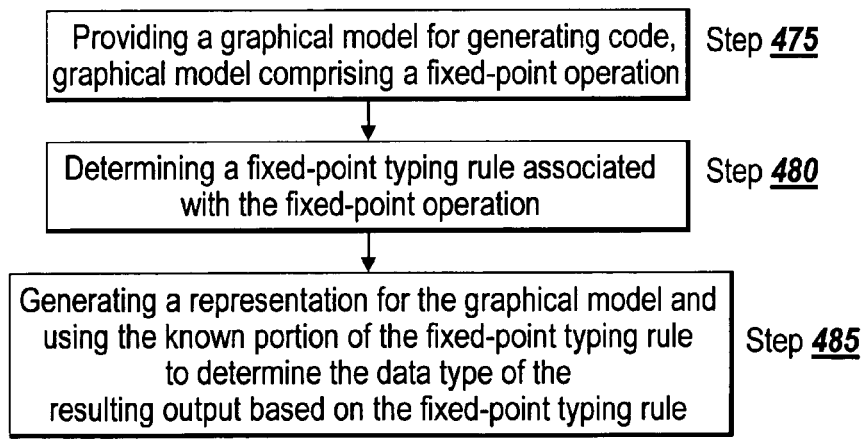
FIG. 4D is a flow diagram depicting an illustrative method of the present invention for generating code for the fixed-point operations of a graphical model illustrated in FIG. 4C using partial evaluation techniques.

In another aspect, the present invention relates to applying a partial evaluation technique to evaluating a fixed-point operation represented or performed by a graphical model 235. For example, in one embodiment, a set of executable instructions 225 may be automatically generated from a graphical model 235 using the code building tool 290 of the present invention. The partial evaluation techniques of the present invention then may be applied to the generated instructions 225. In another embodiment, the partial evaluation techniques of the present invention may be applied to a portion of a graphical model 235 having code or executable instructions 225. Referring now to FIGS. 4C and 4D, another illustrative embodiment of the partial evaluation techniques of the present invention will be discussed. FIG. 4C depicts a graphical model 235 having or representing a fixed-point operation 250. FIG. 4D depicts an illustrative method 470 of practicing the partial evaluation techniques of the present invention for generating code for or from graphical models 235.

In brief overview of FIG. 4C, the graphical model 235 in one embodiment may comprise a block diagram model having blocks B1, B2, B3 and B4. The graphical model 235 may comprise an implementation or design for a fixed-point system, such as a fixed-point processor. For example, block B3 may represent a controller on a fixed-point processor. Via any of the elements or constructs of the graphical model 235, such as a block B4 or a set of executable instructions 225, the graphical model 235 may comprise one or more fixed-point operations 250. For example, in one embodiment, the executable instructions 225 may comprise the instructions illustrated in FIG. 4A. The graphical model 235 may include the executable instructions 225 as functions, such as an S-function in Simulink®, or may make function or API calls to perform the operation, such as Simulink® making function calls to the MATLAB® workspace to perform a fixed-point calculation. In another embodiment, any of the blocks of the graphical model 235 may be a math or function block performing a fixed-point operation 250.

Additionally, the graphical modeling tool 230 may include any suitable type and/or form of configuration mechanism 440 for configuring one or more fixed-point data types 310 and/or fixed-point typing rules 330. The configuration mechanism 440 may enable the specification of any signals or inputs to the graphical model 235 to provide a fixed-point data type 310. Additionally, a block of the graphical model 235 may be configured to convert a non-fixed-point input to a fixed-point data type 310. For example, an analog signal traversing to the block B1 as input may be converted to a digital value having a fixed-point data type 310 for use by the target processor.

Referring now to FIG. 4D, at step 475 of illustrative method 470, a graphical model is provided for representation generation, such as the illustrative graphical model 235 of FIG. 4C. In one embodiment, the graphical model 235 may comprise a block diagram model provided via a Simulink® and/or Stateflow® graphical modeling tool 230. In some embodiments, the graphical model 235 is provided via any electronic form, such as a file, for example, a .mdl or .rtw file in the embodiment of Simulink®. The graphical model 235 may represent a fixed-point operation 250 with one or more inputs, such as a signal, or operands of a fixed-point data type 310a-310b. In one embodiment, the fixed-point operation 250 is represented by a block, such as B3 in FIG. 4C, and in another embodiment, the fixed-point operation 250 is represented by a set of executable instructions, incorporated in, referenced or used by, or otherwise associated with the graphical model 235.

At step 480, the illustrative method 470 determines a fixed-point typing rule 330 associated with the fixed-point operation 250. The fixed-point typing rule 330 may be associated with any portion of the fixed-point operation 250a-250b. In some embodiments, the fixed-point typing rule 330 may be associated with any of the signals, blocks or other elements of the graphical model 235, such as a fixed-point operation block B3 of graphical model 235 in FIG. 4C. In one embodiment, the partial evaluator 275 as part of the representation building tool 290 determines there is a fixed-point operation 250 and/or fixed-point typing rule 330. In another embodiment, the graphical modeling tool 230 may determine the fixed-point typing rule 330 is associated with the fixed-point operation 250.

In some embodiments, the fixed-point typing rule 330 is determined by parsing, interpreting, or otherwise reading the graphical model 235 to identify and/or determine the existence of a fixed-point operation 250 and corresponding fixed-point typing rule 330. For example, in one embodiment, the fixed-point typing rule 330 may be an attribute of a block, a signal or other portion of the graphical model 235 from which the representation building tool 290 reads during code building operations as will be discussed in further detail below in conjunction with FIGS. 5A and 5B. In another embodiment, the fixed-point typing rule 330 may be queried, retrieved, or otherwise obtained from a storage location, such as a file or database, or from a memory location, such as a data structure or object, based on the fixed-point operation 250. In a further embodiment, any variables or objects used by the graphical, model 235 may be used or processed to determine and/or obtain the fixed-point typing rule 330.

At step 485, the illustrative method 470 of the present invention generates a representation for the graphical model 235 using partial evaluation techniques to provide code that represents a determined data type of the output of the fixed-point operation 250. The output may be an intermediate result of the fixed-point operation 250, such as the evaluation of an input. Based on the fixed-point typing rule 330 determined at step 480, the method of the present invention determines the fixed-point data types of any of the output of the fixed-point operation 250. In one embodiment, the illustrative method 470 may be performed for a graphical model 235 representing a design for a fixed-point processor to generate code in a programming language, such as C, to be implemented on the fixed-point processor. The representation generated to represent the fixed-point operation 250 provided via the graphical model 235 can represent the fixed-point data type 310 of the output according to the fixed-point typing rule 330. In one embodiment, the present invention generates a first set of code for the graphical model 235 without using the partial evaluation technique, and then generates a second set of code from the generated first representation using the partial evaluation technique. As such, in this embodiment, the second representation constitutes a specialization of the first set of code using the determined result type of the output from the known data types of the input related to the fixed-point operation.

Although the illustrative methods 420 and 470 of FIGS. 4B and 4D are generally described as determining a resulting type 410 of an output of a fixed-point operation 250 from a fixed-point typing rule 330, there may be times that a fixed-point typing rule 330 does not have a typing rule that covers or fits the scenario or circumstances of the fixed-point operation. In one embodiment, a default fixed-point typing rule may be used for these circumstances. In some embodiments, if a more accurate, precise or specific result type cannot be provided for a fixed-point operation, then the representation of the fixed-point operation may not be generated via partial evaluation and a less efficient representation of the resulting output may be used. For example, a fixed-point data type having a larger number of bits and longer fraction length may be used to represent a wider range of possible values. In other embodiments, the representation generation process may provide an error that partial evaluation cannot be performed or that a suitable fixed-point typing rule needs to be provided.

Figure 5A:
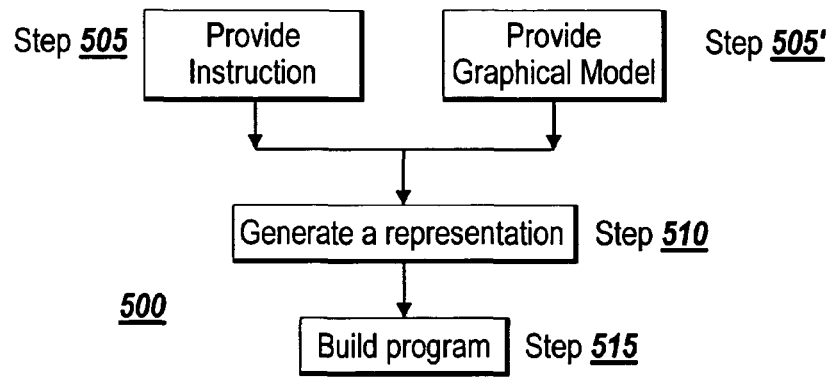
FIG. 5A is a flow diagram depicting an illustrative method for practicing an embodiment of the present invention to generate code for an illustrative graphical model.
Figure 5B:
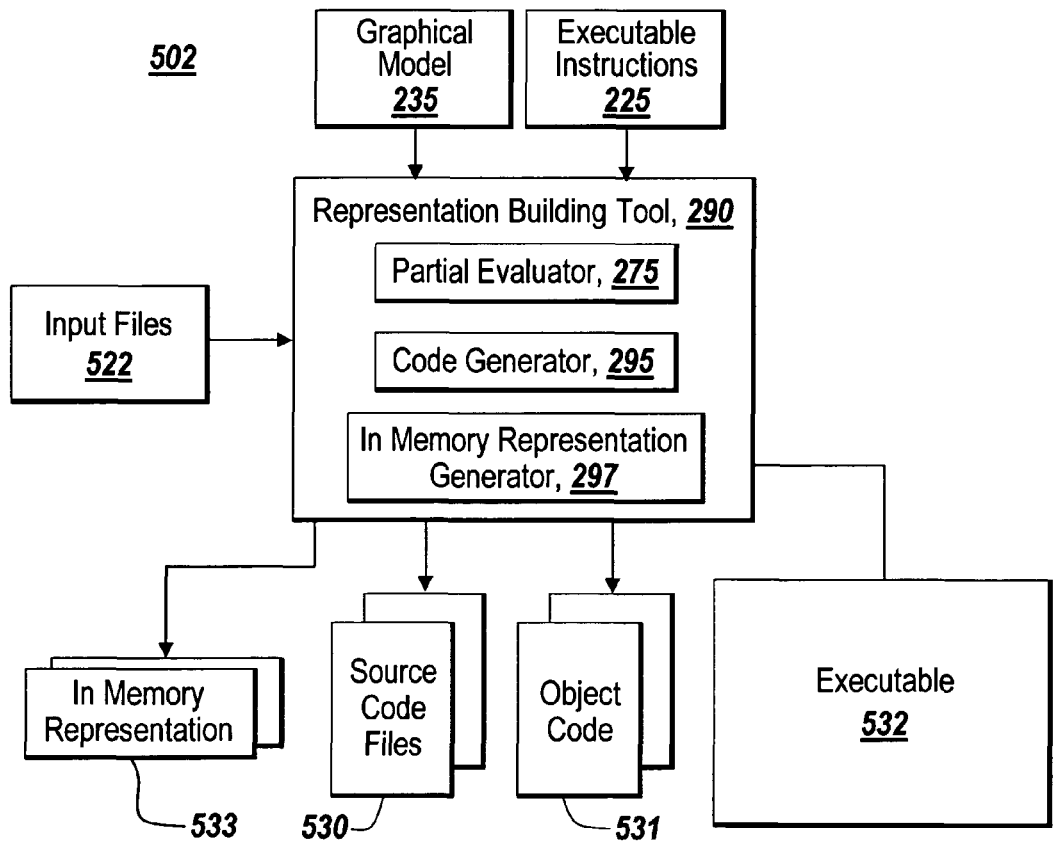
FIG. 5B is a block diagram of an illustrative code generation system for practicing an embodiment of the present invention.

Referring now to FIGS. 5A and 5B, an illustrative method 500 of FIG. 5A and system 502 of FIG. 5B of the present invention will be used to discuss the operations, functions, and structure of the representation generation techniques of the present invention. Referring to FIG. 5B, in brief overview, the representation generating system 502 comprises a representation building tool 290 having a code generator 295, a partial evaluator 275 and an in memory representation generator 297. In an exemplary embodiment of a technical computing and graphical modeling environment 120 of Stateflow® and/or Simulink®, the representation building tool 290 comprises the Stateflow® Coder integrated with Real-Time Workshop®, both manufactured by The MathWorks, Inc.

Referring to FIG. 5A, the illustrative method 500 of the present invention obtains either a set of executable instructions 225 at step 505 in one embodiment, or in another embodiment, a graphical model 235 at step 505'. In some embodiments, the executable instructions 225 and/or the graphical model 235 may be obtained via a file. The graphical model 235 may comprise a file in a format that the representation building tool 290, code generator 295 or in memory representation 297 can read and that follows a file specification for defining elements of the graphical model 235. In other embodiments, the representation building tool 290, code generator 295 or in memory representation generator 297 may obtain either the executable instructions 225 and/or the graphical model 235 from an application programming interface (API) call to another application or via an interface to another environment, such as the programming tool 220 or graphical modeling tool 230 (See FIG. 2A). In yet a further embodiment, the graphical modeling tool 230 and/or the programming tool 220, or another computer program, saves and converts the executable instructions 225 and/or graphical model 235 into a format readable by the representation building tool 290. For example, a graphical model 235 produced with Simulink® and Stateflow® may be converted into an intermediate model file representation such as an .rtw type file readable by the automatic code generator of Real-Time Workshop®.

At step 510 of illustrative method 500, the representation building tool 290, such as Stateflow® Coder and/or Real-Time Workshop®, will generate a representation (such as code) for the graphical model 235 and/or executable instructions 225. The representation building tool 290 and code generator 295 or in memory representation generator 297 use one or more input files 522 in conjunction with reading and processing the graphical model 235 and/or executable instructions 225 or by the in memory representation generator 297 to generate or in memory representation. The one or more input files 522 may comprise files including templates, commands, input parameters, configuration data, source code, data and class definitions, component configuration, device driver or any other information that may be used by the code generator 295 to generate code for the graphical model 235 and/or executable instructions 225. The input files 522 may include files to provide input to and configure the code generator 295 to generate source code files 530 for a specific target hardware platform, for example, a specific processor. In an exemplary embodiment of Real-Time Workshop® as the code generator 295, Real-Time Workshop® uses target language compiler script files, with a .tlc file extension, as input files 522 to the code generation process. The .tlc files provide sections of programming instructions to be implemented for block and element references as they may be found in the graphical model 235 and/or executable instructions 225 during the code generation process. The .tlc files also can provide data and class definitions for data element references found in the graphical model 235 and/or executable instructions 225. Additionally, the .tlc files also comprise compiler directives, built-in functions and other code generation commands to direct Real-Time Workshop® during the code generation process.

In operation, the code generator 295 reads in information regarding or a representation of the graphical model 235 and/or executable instructions 225 and uses the input files 522 or an in-memory representation to generate code by translating the graphical model 235 and/or the executable instructions 225 into one or more source code files 530. By way of example, the automatic code generation can be discussed in terms of generating code with Real-Time Workshop® from a block model diagram 215 generated with Simulink®. Simulink® creates and stores block diagram models 235 into model files with an .mdl file extension. As part of the code generation process, Real-Time Workshop® reads in an .mdl model file and analyzes the model to generate an intermediate model file with an .rtw extension. This intermediate .rtw model file comprises a hierarchical structure of records describing systems and their blocks and connections analyzed from a block diagram model 235 of the .mdl file. Alternatively, the in memory representation generator 297 may generate an in memory representation 533 from the graphical model and/or executable instruction.

In one embodiment, the partial evaluator 275 of the representation building tool 290 performs the techniques depicted in illustrative methods 420 and 470 to generate representations for the graphical model 235 and/or executable instructions 225. In one aspect, the representation building tool 290 generates representations for the fixed-point operation 250 that represent the fixed-point operation 250 analyzed and modified to a form with known static inputs, such as known fixed-point data types of inputs. In another aspect, the representation building tool 290 generates representations that represent the fixed-point data type 310 of input to the fixed-point operation 250 and the fixed-point data type 410 of output of the fixed-point operation 250 determined via one or more fixed-point typing rules 330 and applying partial evaluation. As such, based on the known static fixed-point data type related inputs, the representations for any fixed-point data type of outputs of the operation 250 is determined.

In one embodiment, the representation building tool 290 performs the techniques of the present invention when generating the intermediate model .rtw file for a graphical model 235. In another embodiment, the representation building tool 290 may perform the techniques of the present invention when processing the generated .rtw file to provide code. In a further embodiment, the representation building tool 290 may perform the techniques of the present invention when converting executable instructions 225 in one language to another language. In one embodiment, the representation building tool 290 may perform the techniques of the present invention to convert from one set of executable instructions 225 to another set in the same language but with the result types 410 of the output defined and represented based on any of the fixed-point typing rule parameters 331. In other embodiments, the representation building tool 290 may perform the techniques of the present invention to modify a set of executable instructions 225 to another set with code removed, simplified or changed to reflect the known or static portion of the fixed-point operation 250.

With the partial evaluator 275, code for the fixed-point operation 250 may be generated representing code that will actually be executed based on any of the static information given by the inputs. Any code that will not be executed based on any of the static information may be eliminated. For example, in the executable instructions 225 in FIG. 3B, the statement "if ~isfi(b0)" is an instruction that can be determined at the time of partial evaluation. Either the branch of the statement is taken or not taken, and code is generated to represent the branch known to be taken. In the following example of instructions 225, ta=eml_typeof(a0);
% Verify that scaling is not slope-bias
biasA=eml_const(get(ta,'Bias'))

the expression get(ta,'Bias') is evaluated at compile time and its corresponding constant value is inserted in the generated code. Thus, the expression "eml_const(get(ta,'Bias'))" can be reduced to a constant value.

In further aspects, the technique of the present invention provides a reduction of the instructions of the fixed-point operation 250 and/or fixed-point typing rule 330 into a form that takes into account or consideration the portions of the fixed-point operation 250 and/or fixed-point typing rule 330 known at the time or point of code generation. In reducing the instructions into another form, one or more instructions of the fixed-point operation 250 and/or fixed-point typing rule 330 may be modified, converted, changed, altered, deleted, or added to represent the portion that is known. The reduction of the instructions may be based on any values of parameters 331 or variables of the fixed-point operation 250 known at code generation time. The reduction of the instructions may also be based on any known paths of execution of conditional statements, or otherwise that would or would not occur based on the known or static information at the time of code generation.

The reduction of the instructions 225 based on the partial evaluation techniques of the present invention provides the instructions in a form that may be more efficient, simpler, or quicker to execute. For example, one or more conditional statements of a fixed-point typing rule 330 may be removed providing less instructions to execute. One ordinarily skilled in the art will recognize and appreciate the various modifications, deletions, additions, alteration, conversion or transformation of the executable instructions 225 of the fixed-point operation 250 that may occur to represent the fixed-point operation 250 or provide a reduction of the fixed-point operation 250 based on the known or static information associated with inputs, the fixed-point typing rule 330, and fixed-point typing rule parameters 331.

In further detail of the representation building tool 290, a language compiler called the target language compiler of Real-Time Workshop® works with .tlc files and .rtw files to produce code. The target language compiler interprets a program that reads the intermediate model file description of an .rtw file. As the target language compiler encounters a record in the .rtw file, it uses directives in the .tlc files corresponding to the record to direct the code generation process for the specific record. As such, the target language compiler works much like a text processor. For example, the target language compiler uses block .tlc files, which specify the particular code for a block, to transform each block into code. When it reads a record in the .rtw file that references a block, the target language compiler applies code from the corresponding block .tlc file to generate code for the block in source code files 522. Additionally, model wide .tlc files are also used to provide input to the target language compiler for global customization of the code. Model wide .tlc files may direct the target language compiler to generate main routines to provide entry points into the program, source code header files to setup data structures, and utility functions to support code for particular blocks. The block and model wide .tlc files can be modified to generate customized code for blocks and to generate any desired global customizations to the code.

The source code files 530 generated from the code generator 295, such as Real-Time Workshop®, may comprise program instructions of a programming language, such as C, which may further be in a format and style following the ANSI/ISO C standard. Additionally, the source code files 530 may be generated to comprise fixed-point or floating-point source code. The programming instructions of the source code files 530 may be generated to run on any real-time operating system or for a specific processor. In a further embodiment, the programming instructions of the source code files 530 may be optimized for performance or versatility, and/or for a specific target hardware platform. In another embodiment, the code generator 295 can be configured via the input files 522 to generate custom source code comprising a style and format as directed by the input files 522. The code generator 295 can be also configured via the input files 522 to provide customized source code to support such customizations as error handling, optimization, code and data reduction, code reusability, scoping of variables, and other characteristics of the source code that may be modified during the source code generation process.

In some embodiments, a portion of the source code 530 or object code 531 generated or provided by illustrative method 500 may be targeted to run on a specific computational hardware device, such as an embedded hardware platform, or a specific processor of a computing device 102 and another portion may be targeted to run on a personal computer, such as a desktop or notebook. For example, a portion of the graphical model 235 may process data or perform loops that are time critical. In comparison, the display may not need to be updated in a time critical manner as the viewer's eyes may only perceive updates at a certain rate. The time critical data processing or loops may be embodied in source code 530 and/or object code 531 targeted for a specific processor of a certain speed or capability and the non-time critical code 530, 531 may be targeted for any general computing device. One ordinarily skilled in the art will recognize and appreciate the various ways to process and target various portions of code to meet the desired functionality and/or execution of the graphical model 235 and/or executable instructions 225.

At step 515 of illustrative method 500, one or more programs may be built from the automatically generated code to provide an executable form to execute the graphical model 235 and/or executable instructions. The representation building tool 290 also provides for the building of the source code files 530 into object code 531 to generate one or more programs to run on a target platform and/or operating system. The build process of illustrative step 515 of the present invention may include compiling the code and linking libraries, drivers, and other programs via a make program or some other compiling utility. In one embodiment, the representation building tool 290 invokes a compiler provided by software available with the operating system, such as a make utility on a UNIX operating system. In another embodiment, the compiler may be provided from a software development package such as Visual C/C++ from Microsoft Corporation of Redmond, Wash. One ordinarily skilled in the art will recognize the representation building tool 290 may invoke any type of compiler that is configured to and capable of translating the source code 530 into object code 531 to be executed by the target computing device 102.

Although the code generator 295 is generally discussed in terms of generating source code, the code generator 295 may provide code in any other form, such as object code, pre-existing source code, or other programmable instructions suitable for representing the functionality of the graphical model 235 and state machine diagram model 225. Additionally, although the illustrative embodiment of the present invention is discussed in terms of source code files 530 and object code 531 from a programming language like C, the code generator 295 may generate any type of programming related output, such as an interpreted programming language and/or scripting language. For example, the code generator 295 may generate code for perl, awk, VBscript, Javascript, tcl, or the technical computing programming language of MATLAB®. In other cases, the code generator 295 may generate output in other types of languages, such as the hardware description language of HDL. One ordinarily skilled in the art will recognize the various types of languages the code building tool may apply in generating code and how the code generator may build the code based on the type of language.

In view of the structure, functions and operations of the systems and methods as described herein, the present invention provides partial evaluation techniques for generating more efficient code for fixed-point operations from executable instructions, such as an interpreted dynamically typed language, or executable instructions provided by or generated from graphical models. Using partial evaluation, the code reflects a determination of data types of the resulting output of a fixed-point operation from any known data types of the input or operands to the operation, and fixed-point typing rules implemented or associated with the operation. This determination can be configurable and flexible via fixed-point typing rules, which may be specified by a user. Additionally, the present invention generates code that reflects changes in the fixed-point typing rules so that the same graphical model or executable instructions may generate different sets of code based on the selection of or changes to the fixed-point typing rule parameters.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method performed by an electronic device, the method comprising:
   identifying, by the electronic device, a fixed-point operation in a first representation,
     the fixed-point operation utilizing a first operand and a second operand,
     the first operand having a first data type comprising a first slope value and a first bias value,
     the second operand having a second data type comprising a second slope value and a second bias value, and
     the first slope value being different from the second slope value or the first bias value being different from the second bias value;
   determining, by the electronic device, a fixed-point typing rule based on the first data type of the first operand and the second data type of the second operand;
   associating, by the electronic device, the fixed-point typing rule as an attribute of a portion of a graphical model;
   determining, by the electronic device and at compile time, that the first data type of the first operand and the second data type of the second operand are known;
   determining, by the electronic device, a result data type of an output of the fixed-point operation based on the fixed-point typing rule, the first data type of the first operand, and the second data type of the second operand;
   generating, by the electronic device and for the graphical model, a second representation of the fixed-point operation based on determining the result data type;
   evaluating, by the electronic device and during execution, the fixed-point operation based on the second representation; and
   generating, by the electronic device and based on evaluating the second representation, the output of the fixed-point operation having the result data type.

2. The method of claim 1, wherein the first representation includes code.

3. The method of claim 1, wherein determining the result data type comprises:
   determining a known portion of the fixed-point typing rule, the known portion comprising a characteristic of the result data type of the output, and
   determining the result data type based on the known portion of the fixed-point typing rule.

4. The method of claim 1,
   wherein the first representation comprises one or more static inputs,
   wherein determining the result data type comprises:
     determining a known portion of the fixed-point typing rule, and
     determining the result data type based on the known portion of the fixed-point rule, and
   wherein determining the known portion of the fixed-point typing rule comprises:
     determining one or more instructions that will not be executed based on the one or more static inputs, and
     eliminating the one or more instructions that will not be executed.

5. The method of claim 1,
   wherein determining the result data type comprises:
     determining a known portion of the fixed-point typing rule, and
     determining the result data type based on the known portion of the fixed-point typing rule, and
   wherein the known portion of the fixed-point typing rule comprises a determined value of one or more fixed-point typing rule parameters associated with the result data type.

6. The method of claim 1,
   wherein the fixed-point operation is encoded in instructions, and
   wherein the first representation is produced by one of adding, changing, or deleting one or more of the instructions.

7. The method of claim 1, further comprising:
   using, according to the fixed-point typing rule, a parameter representing one or more characteristics of the result data type,
   the one or more characteristics including one or more of:
     a result slope;
     a result bias;
     a fraction length;
     a number of bits;
     a scaling;
     whether a fixed-point data type is signed; or
     whether the fixed-point data type is unsigned.

8. The method of claim 1, further comprising:
   configuring the fixed-point typing rule to specify the result data type of the output based on one or more of:
     a type of operation,
     a desired precision,
     an overflow condition, or
     an underflow condition.

9. The method of claim 1, wherein the fixed-point operation is encoded in instructions in one of an interpretive programming language or a dynamically typed programming language of the first representation.

10. The method of claim 1, wherein the second representation is encoded in a programming language that is different from a programming language in which the fixed-point operation is provided.

11. The method of claim 1,
    wherein the electronic device includes a memory, and
    wherein the first representation is stored in the memory of the electronic device.

12. The method of claim 1, where the result data type indicates a word length.

13. The method of claim 1, where identifying the fixed-point operation comprises:
    analyzing the first representation to identify an existence of the fixed-point operation.

14. A system comprising:
    one or more processors to:
      identify a first representation of a fixed-point operation having a first operand and a second operand,
        the first operand having a first data type, and
        the second operand having a second data type;

determine a fixed-point typing rule based on the first data type of the first operand and the second data type of the second operand;

associate the fixed-point typing rule as an attribute of a portion of a graphical model;

determine, at compile time, that the first data type of the first operand and the second data type of the second operand are known;

determine a result data type of an output of the fixed-point operation based on the fixed-point typing rule, the first data type of the first operand, and the second data type of the second operand;

generate, based on determining the result data type, a second representation of the fixed-point operation for the graphical model;

evaluate, during execution, the fixed-point operation based on the second representation; and generate, based on evaluating the fixed-point operation, the output of the fixed-point operation having the result data type.

15. The system of claim 14, wherein the one or more processors are to:
provide a graphical modeling tool.

16. The system of claim 14, wherein the first representation comprises a portion of the graphical model.

17. The system of claim 14, wherein the fixed-point typing rule comprises a determined characteristic of the result data type of the output.

18. The system of claim 14,
wherein the first representation comprises one or more static inputs, and
wherein, before generating the second representation, the one or more processors are further to:
determine one or more instructions that will not be executed based on the one or more static inputs; and
eliminate the one or more instructions that will not be executed.

19. The system of claim 14, wherein the fixed-point typing rule comprises a determined value of one or more fixed-point typing rule parameters associated with the result data type.

20. The system of claim 14,
wherein the first representation constitutes instructions for the fixed-point operation, and
wherein the one or more processors are to perform one of adding, changing, or deleting one or more of the instructions for the fixed-point operation.

21. The system of claim 14,
wherein the fixed-point typing rule uses a parameter representing one or more characteristics of the result data type, and
wherein the one or more characteristics of the result data type include one or more of:
a result slope;
a result bias;
a fraction length;
a number of bits;
a scaling;
whether a fixed-point data type is signed; or
whether the fixed-point data type is unsigned.

22. The system of claim 14, wherein the fixed-point typing rule is configured to specify the result data type of the output based on one or more of:
a type of operation,
a desired precision,
an overflow condition, or
an underflow condition.

23. The system of claim 14, wherein the first representation comprises instructions encoded in one of an interpretive programming language or a dynamically typed programming language.

24. The system of claim 14, wherein the generated second representation is in a programming language different than a programming language of the fixed-point operation.

25. The system of claim 14, wherein the fixed-point operation is specified via the graphical model.

26. The system of claim 14, wherein the one or more processors are further to:
generate the first representation from the graphical model.

27. The system of claim 14, where the result data type indicates a number of bits.

28. A non-transitory device readable medium storing instructions, the instructions comprising:
one or more instructions that, when executed by one or more processors, cause the one or more processors to:
identify a fixed-point operation in a first representation, the operation utilizing a first operand and a second operand,
the first operand having a first data type, and
the second operand having a second data type;
determine a fixed-point typing rule based on the first data type of the first operand and the second data type of the second operand;
associate the fixed-point typing rule as an attribute of a portion of a graphical model;
determine, at compile time, that the first data type of the first operand and the second data type of the second operand are known;
determine, based on the fixed-point typing rule, the first data type of the first operand, and the second data type of the second operand, a result data type of the fixed-point operation;
generate, based on determining the result data type, a second representation for the graphical model;
evaluate, during execution, the fixed-point operation based on the second representation; and
generate, based on evaluating the fixed-point operation, an output of the fixed-point operation having the result data type.

29. The non-transitory device readable medium of claim 28, wherein the first representation is code.

30. The non-transitory device readable medium of claim 28, wherein the fixed-point typing rule comprises a determined characteristic of the result data type of the output.

31. The non-transitory device readable medium of claim 28, wherein the first representation comprises one or more static inputs.

32. The non-transitory device readable medium of claim 28, wherein the fixed-point typing rule comprises a determined value of one or more fixed-point typing rule parameters associated with the result data type.

33. The non-transitory device readable medium of claim 28, wherein the operation is encoded in particular instructions, and
wherein the instructions further comprise:
one or more instructions that, when executed by the one or more processors, cause the one or more processors to:
produce the first representation by adding, changing, or deleting one of the particular instructions.

34. The non-transitory device readable medium of claim 28, further comprising:
one or more instructions that, when executed by the one or more processors, cause the one or more processors to:

use, according to the fixed-point typing rule, a parameter representing one or more characteristics of the result data type, the one or more characteristics including one or more of:
- a result slope;
- a result bias;
- a fraction length;
- a number of bits;
- a scaling;
- whether a fixed-point data type is signed; or
- whether the fixed-point data type is unsigned.

35. The non-transitory device readable medium of claim 28, further comprising:
one or more instructions that, when executed by the one or more processors, cause the one or more processors to:
configure the fixed-point typing rule to specify the result data type of the output based on one or more of:
- a type of operation,
- a desired precision,
- an overflow condition, or
- an underflow condition.

36. The non-transitory device readable medium of claim 28, wherein the fixed-point operation is encoded in instructions in one of an interpretive programming language or a dynamically typed programming language.

37. The non-transitory device readable medium of claim 28, wherein the second representation is encoded in instructions in a programming language that is different from a programming language in which the fixed-point operation is provided.

38. The non-transitory device readable medium of claim 28, wherein the first representation is a representation stored in a memory of an electronic device that includes the one or more processors.

39. The non-transitory device readable medium of claim 28, where the result data type indicates a word length or a quantity of bits.

* * * * *